US010220702B2

(12) United States Patent
Ohkawa et al.

(10) Patent No.: US 10,220,702 B2
(45) Date of Patent: Mar. 5, 2019

(54) MOTIVE FORCE TRANSMISSION DEVICE AND PRODUCTION METHOD THEREFOR

(71) Applicant: MAZDA MOTOR CORPORATION, Hiroshima (JP)

(72) Inventors: Yuzo Ohkawa, Hiroshima (JP); Eiji Mito, Hiroshima (JP); Seiji Hidaka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 254 days.

(21) Appl. No.: 15/119,219

(22) PCT Filed: Jan. 14, 2015

(86) PCT No.: PCT/JP2015/050767
§ 371 (c)(1),
(2) Date: Aug. 16, 2016

(87) PCT Pub. No.: WO2015/146225
PCT Pub. Date: Oct. 1, 2015

(65) Prior Publication Data
US 2017/0008395 A1 Jan. 12, 2017

(30) Foreign Application Priority Data

Mar. 27, 2014 (JP) ................................ 2014-066678

(51) Int. Cl.
*B60K 17/346* (2006.01)
*B60K 17/344* (2006.01)
(Continued)

(52) U.S. Cl.
CPC .......... *B60K 17/346* (2013.01); *B60K 17/344* (2013.01); *B60K 17/348* (2013.01);
(Continued)

(58) Field of Classification Search
CPC ... B60K 17/344; B60K 17/346; F16F 15/126; F16D 3/12; F16D 3/50; F16H 37/0806
See application file for complete search history.

(56) References Cited

U.S. PATENT DOCUMENTS 2,848,884 A * 8/1958 Maude ................. F16D 1/0835
464/30
2007/0029127 A1 2/2007 Mori et al.
2009/0139811 A1* 6/2009 Mochihara .......... F16F 15/1435
188/268

FOREIGN PATENT DOCUMENTS

CN 1911700 A 2/2007
JP S60-091523 U 6/1985
(Continued)

OTHER PUBLICATIONS

International Search Report issued in PCT/JP2015/050767; dated Apr. 21, 2015.
(Continued)

*Primary Examiner* — Robert W Hodge
*Assistant Examiner* — Lori Wu
(74) *Attorney, Agent, or Firm* — Studebaker & Brackett PC

(57) ABSTRACT

A power transfer unit for transferring power from a front wheel side to a rear wheel side comprises: a hollow transfer input shaft which is coupled to an engine and through which a right-side front-wheel axle is penetrated; a transfer output shaft disposed to extend in a direction orthogonal to the transfer input shaft; a transfer drive gear provided on an outer periphery of the transfer input shaft; and a transfer driven gear provided on an outer periphery of the transfer output shaft and meshed with the transfer drive gear. It further comprises a damper mechanism configured to absorb a fluctuation in torque input from an engine side into the transfer input shaft. The damper mechanism is disposed such (Continued)

that an intermediate portion and a left end-side portion thereof overlap the transfer driven gear in an extension direction of the transfer output shaft, in top plan view.

15 Claims, 21 Drawing Sheets

(51) Int. Cl.
    *F16D 3/12*     (2006.01)
    *F16D 3/50*     (2006.01)
    *F16F 15/126*     (2006.01)
    *B60K 17/348*     (2006.01)
    *F16H 37/08*     (2006.01)

(52) U.S. Cl.
    CPC ................ *F16D 3/12* (2013.01); *F16D 3/50* (2013.01); *F16F 15/126* (2013.01); *F16H 37/0806* (2013.01); *B60Y 2400/48* (2013.01)

(56) References Cited

FOREIGN PATENT DOCUMENTS

| | | |
|---|---|---|
| JP | S60-126756 U | 8/1985 |
| JP | S62-174136 U | 11/1987 |
| JP | S63-046924 A | 2/1988 |
| JP | S63-110031 A | 5/1988 |
| JP | 2002-337562 A | 11/2002 |

OTHER PUBLICATIONS

An Office Action issued by the Chinese Patent Office dated Jan. 17, 2018, which corresponds to Chinese Patent Application No. 201580012827.7 and is related to U.S. Appl. No. 15/119,219; with an English summary.

\* cited by examiner

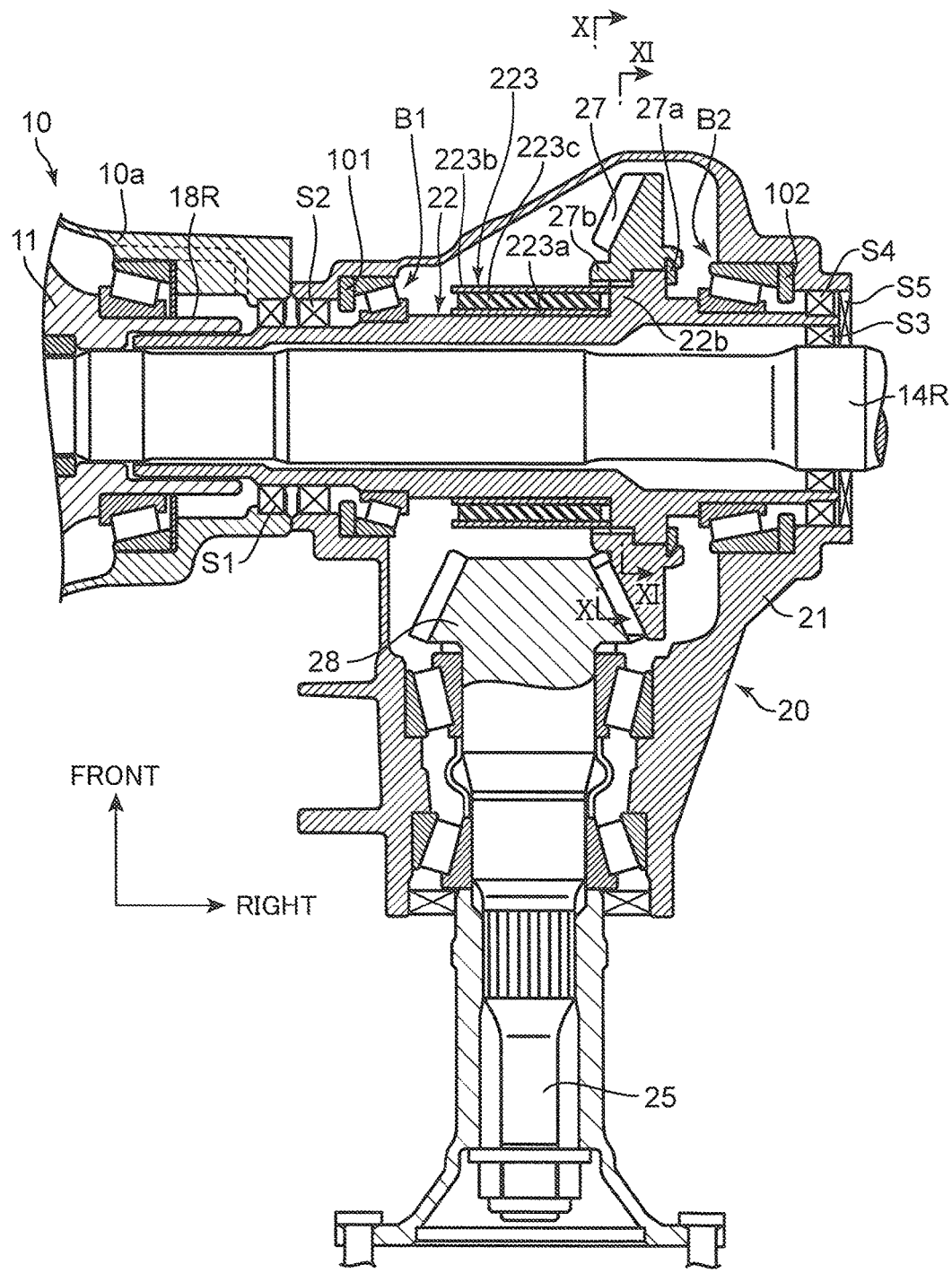

MOTIVE FORCE TRANSMISSION DEVICE AND PRODUCTION METHOD THEREFOR

TECHNICAL FIELD

The present invention relates to a power transfer unit for transferring power from a front wheel side to a rear wheel side, or from the rear wheel side to the front wheel side, and a production method for the power transfer device.

BACKGROUND ART

A four-wheel-drive vehicle is equipped with a power transfer unit for transferring power from a front wheel side to a rear wheel side, or from the rear wheel side to the front wheel side. For example, in the case where an engine is mounted on a front portion of a vehicle body, an output torque of an engine is input into a front-wheel differential gear unit (front differential) via a clutch or torque converter, and a transmission. The torque input into the front differential is transferred to right and left front wheels, respectively, through right and left front-wheel axles, and is input into a power transfer unit through a differential casing of the front differential.

The power transfer unit (transfer) comprises a transfer input shaft disposed to extend in a vehicle width (lateral) direction and a transfer output shaft disposed to extend in a vehicle front-rear (longitudinal) direction. A transfer drive gear is provided on an outer periphery of the transfer input shaft, and a transfer driven gear is provided on an outer periphery of the transfer output shaft, wherein the two gears are meshed with each other. The transfer input shaft is a hollow shaft, wherein one of the front-wheel axles is penetrated through the transfer input shaft, and the differential casing is coupled to the transfer input shaft to allow torque from an engine side to be input into the transfer input shaft. The torque input into the transfer input shaft is transferred to the transfer output shaft via the transfer drive gear and the transfer driven gear, and then taken out toward the rear wheel side through a propeller shaft coupled to the transfer output shaft.

Such a power transfer unit involves a problem that, upon a fluctuation in the output torque of the engine, gear rattle occurs between the transfer drive gear and the transfer driven gear, thereby causing noise. With a view to coping with this problem, the following Patent Literature 1 describes interposing a damper mechanism comprising a metal compression coil spring and a rubber member, in a power transfer pathway between a rotary member configured to receive an input of torque from the engine side, and the transfer drive gear. It also describes that a fluctuation in torque from the engine side is absorbed by the coil spring, and a fluctuation in torque from the rear wheel side is absorbed by the rubber member, whereby, in either event, the occurrence of gear rattle between the transfer drive gear and the transfer driven gear can be suppressed.

CITATION LIST

Patent Literature

Parent Literature 1: JP 2002-337562A

SUMMARY OF INVENTION

However, in the power transfer unit described in the Patent Literature 1, the damper mechanism, the transfer drive gear and transfer driven gear are arranged side-by-side in this order along an axial direction of the transfer input shaft, so that the power transfer unit is elongated in the axial direction, i.e., increased in axial dimension, leading to a problem that mountability of the power transfer unit is deteriorated, and moreover compatibility with a power transfer unit devoid of the damper mechanism, in terms of a transfer casing, is lost.

While this is the case where power is transferred from the front wheel side to the rear wheel side, the same situation applies to the case where power is transferred from the rear wheel side to the front wheel side.

The present invention has been made in view of the above existing circumstances surrounding power transfer units, and an object thereof is to provide a power transfer unit which is suppressed in terms of increase in axial dimension thereof.

As a solution to the above technical problem, the present invention relates to a power transfer unit for transferring power from a front wheel side to a rear wheel side, or from the rear wheel side to the front wheel side. The power transfer unit comprises: a transfer input shaft coupled to a power source; a transfer output shaft disposed to extend in a direction orthogonal to the transfer input shaft; a transfer drive gear provided on an outer periphery of the transfer input shaft; a transfer driven gear provided on an outer periphery of the transfer output shaft and meshed with the transfer drive gear, and a damper mechanism configured to absorb a fluctuation in torque input from a power source side into the transfer input shaft, wherein the damper mechanism is disposed such that at least a part thereof overlaps the transfer driven gear in an extension direction of the transfer output shaft, in top plan view.

As above, the present invention provides a power transfer unit which is suppressed in terms of increase in axial dimension thereof, and therefore contributes to technological development and improvement in a power transfer unit for transferring power from a front wheel side to a rear wheel side, or from the rear wheel side to the front wheel side.

These and other objects, features, and advantages of the present invention will become apparent upon reading of the following detailed description along with the accompanying drawings.

BRIEF DESCRIPTION OF DRAWINGS

FIG. 9 is a top plan sectional view corresponding to FIG. 2, depicting a power transfer unit according to a second embodiment of the present invention.

DESCRIPTION OF EMBODIMENTS

With reference to the drawings, embodiments of the present invention will now be described.

<First Embodiment>

(1) Overall Configuration

Figure 1:
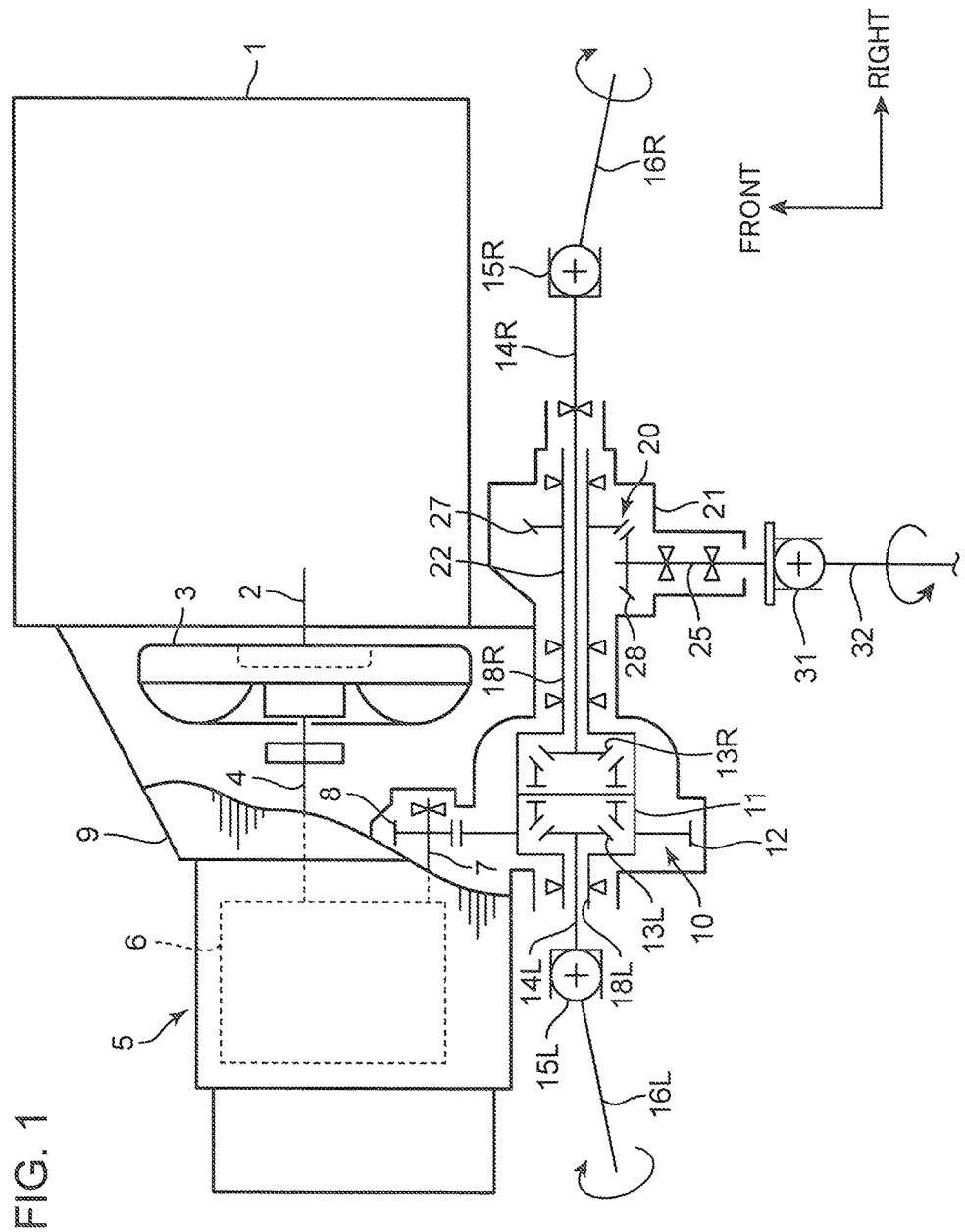
FIG. 1 is a skeleton diagram depicting a power transfer pathway of a four-wheel-drive vehicle pertaining to a first embodiment of the present invention.

FIG. 1 is a skeleton diagram depicting a power transfer pathway of a four-wheel-drive vehicle concerning this embodiment. In FIG. 1, the set of symbols "∇" and "Δ" denotes a bearing.

In the four-wheel-drive vehicle pertaining to this embodiment, an engine (which is equivalent to "power source" in the appended claims) 1 is transversely mounted within an engine compartment in a front portion of a vehicle body of the vehicle, in a posture where a crankshaft 2 thereof extends in a vehicle width (lateral) direction. A torque converter 3 is coupled in series to the crankshaft 2, and an automatic transmission 6 is coupled in series to a turbine shaft 4 of the torque converter 3. An output shaft 7 of the automatic transmission 6 is disposed to extend in the vehicle width direction, and provided with an output gear 8. An output torque of the engine 1 speed-changed by the automatic transmission 6 is transferred to a front-wheel differential gear unit (front differential) 10 through the output gear 8.

The front differential 10 comprises a differential casing 11. A ring gear 12 assembled to the differential casing 11 is meshed with the output gear 8. Left and right side gears 13L, 13R are housed in the differential case 11, and left and right shaft penetration portions 18L, 18R are provided in the differential case 11, correspondingly to the side gears 13L, 13R. Left and right front-wheel axles (drive shafts) 14L, 14R disposed to extend in the vehicle width direction are penetrated, respectively, through the shaft penetration portions 18L, 18R, and one ends of the front-wheel axles 14L, 14R is spline-engaged, respectively, with the side gears 13L, 13R. Left and right front-wheel hub shafts 16L, 16R are coupled, respectively, to the other ends of the front-wheel axles 14L, 14R through left and right universal joints 15L, 15R, and left and right front wheels (depiction is omitted) are connected, respectively, to distal ends of the front-wheel hub shafts 16L, 16R.

In FIG. 1, the reference sign "5" denotes a transaxle composed of the automatic transmission 6 and the front differential 10. The transaxle 5 is housed in a transaxle casing 9 together with the torque converter 3.

Figure 2:
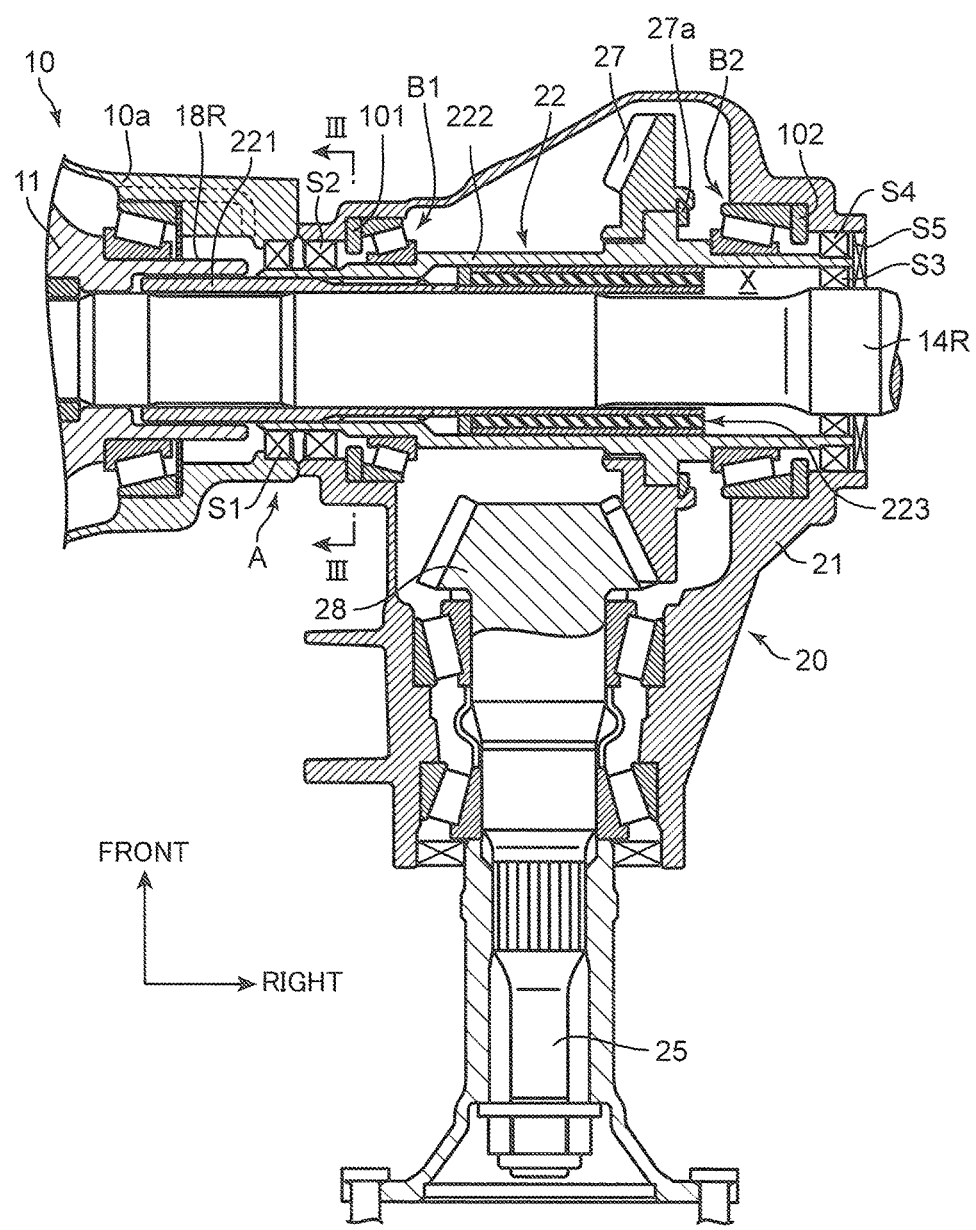
FIG. 2 is a top plan sectional view depicting a specific configuration of a power transfer unit according to the first embodiment.

FIG. 2 is a sectional view depicting a specific configuration of a power transfer unit (transfer) 20 according to this embodiment. Additionally referring to FIG. 2, the discussion will be continued below.

A hollow transfer input shaft 22 disposed to extend in the vehicle width direction is coupled to the right-side shaft penetration portion 18R of the differential casing 11, by means of spline engagement. The right-side front-wheel axle 14R is penetrated through the transfer input shaft 22. The transfer 20 comprises: the transfer input shaft 22; a transfer drive gear 27 provided on an outer periphery of the transfer input shaft 22; a transfer output shaft 25 disposed to extend in a vehicle front-rear (longitudinal) direction; and a transfer driven gear 28 provided a front end of and on an outer periphery of the transfer output shaft 25. The transfer driven gear 28 is formed such that a diameter thereof is greater than that of the transfer output shaft 25. The transfer drive gear 27 is formed in a ring shape, and joined to the transfer input shaft 22 by means of a snap ring 27a. Each of the transfer drive gear 27 and the transfer driven gear 28 is a bevel gear, and they are meshed with each other in such a manner that axes thereof intersect each other at a right angle.

In this embodiment, as the transfer drive gear 27 and the transfer driven gear 28, a hypoid gear set whose axes are mutually offset in an upward-downward direction is employed which is advantageous in terms of suppression of gear noise and improvement of strength. The various members making up the transfer 20 are housed in a transfer casing 21.

A rear end of the transfer output shaft 25 is coupled to a propeller shaft 32 through a universal joint 31. Torque transferred from the side of the engine 1 to the differential casing 11 via the output gear 8 of the automatic transmission 6 and the ring gear 12 of the front differential 10 is input into the transfer input shaft 22 through the right-side shaft penetration portion 18R of the differential casing 11 (i.e., the transfer input shaft 22 is communicated with the engine), and then transferred to the transfer output shaft 25 via the transfer drive gear 27 and the transfer driven gear 28, whereafter it is taken out toward a rear wheel side through the propeller shaft 32. That is, the transfer 20 according to this embodiment is designed to transfer power from a front wheel side to the rear wheel side.

(2) Features of First Embodiment

As depicted in FIG. 2, a damper mechanism 223 is provided in an internal space X between an outer periphery of the right-side front-wheel axle 14R penetrated through the transfer input shaft 22, and an inner periphery of the transfer input shaft 22. The damper mechanism 223 is provided as a means to absorb a fluctuation in torque input from the side of the engine 1 into the transfer input shaft 22. This makes it possible to suppress the occurrence of gear rattle between the transfer drive gear 27 and the transfer driven gear 28.

More specifically, the transfer input shaft 22 comprises two members consisting of a first shaft member 221 and a second shaft member 222. The first shaft member 221 makes up a left portion of the transfer input shaft 22, and the second shaft member 222 makes up a right portion of the transfer input shaft 22.

Figure 3:
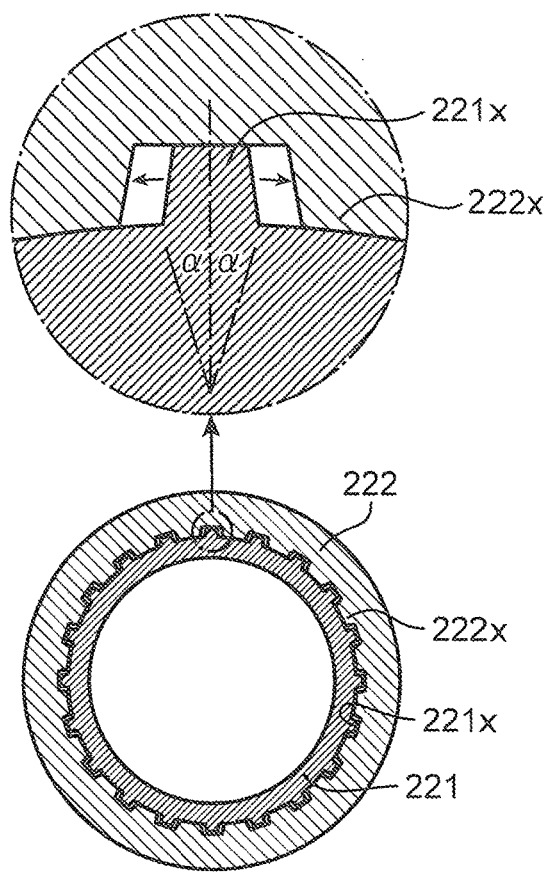
FIG. 3 is a sectional view taken along the line III-III in FIG. 2, depicting a spline engagement region between a first shaft member and a second shaft member of a transfer input shaft in the power transfer unit.
Figure 6:
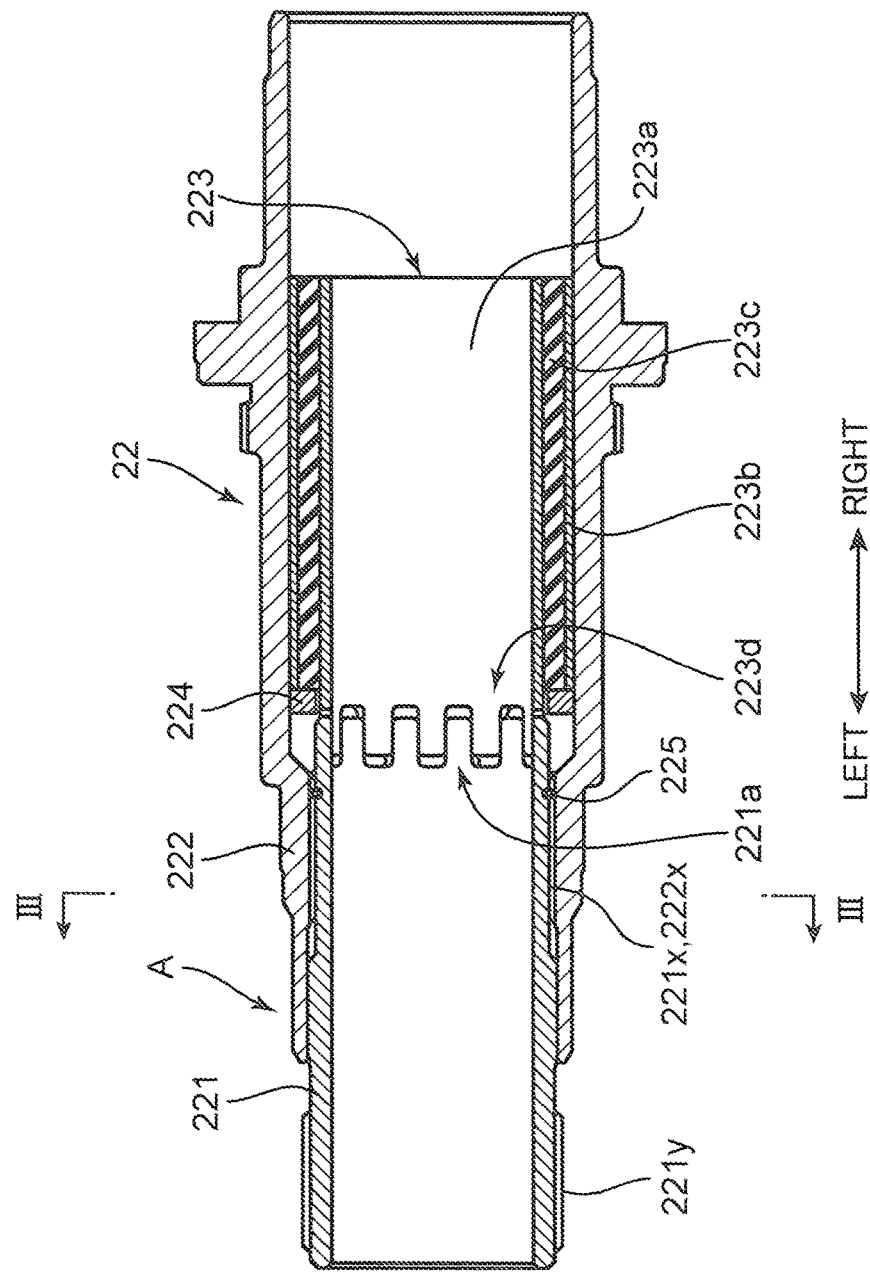
FIG. 6 is a sectional view depicting a state in which the damper mechanism is assembled to an inner peripheral surface of the transfer input shaft.

As depicted in FIGS. 2, 3 and 6, the first shaft member 221 is formed in a circular tubular shape having a smooth (stepless) inner peripheral surface, wherein a diameter of the inner peripheral surface (inner diameter) thereof is slightly greater than an outer diameter of the right-side front-wheel axle 14R. The first shaft member 221 has external spline teeth 221$y$ formed on an outer peripheral surface of a left end thereof (see FIG. 6). The external spline teeth 221$y$ are provided as a means for spline engagement with the right-side shaft penetration portion 18R of the differential casing 11. The first shaft member 221 has external spline teeth 221$x$ formed on an outer peripheral surface of a right end thereof (see FIGS. 3 and 6). The external spline teeth 221$x$ are provided as a means for spline engagement with aftermentioned internal spline teeth 222$x$ in a left end of the second shaft member 222. The first shaft member 221 has comb-like teeth 221$a$ formed in an edge face of the right end thereof (see FIG. 6). The comb-like teeth 221$a$ are provided as a means for press fitting with comb-like teeth 223$d$ formed in an edge face of a left end of an aftermentioned inner tube 223$a$ of the damper mechanism 223.

Figure 5:
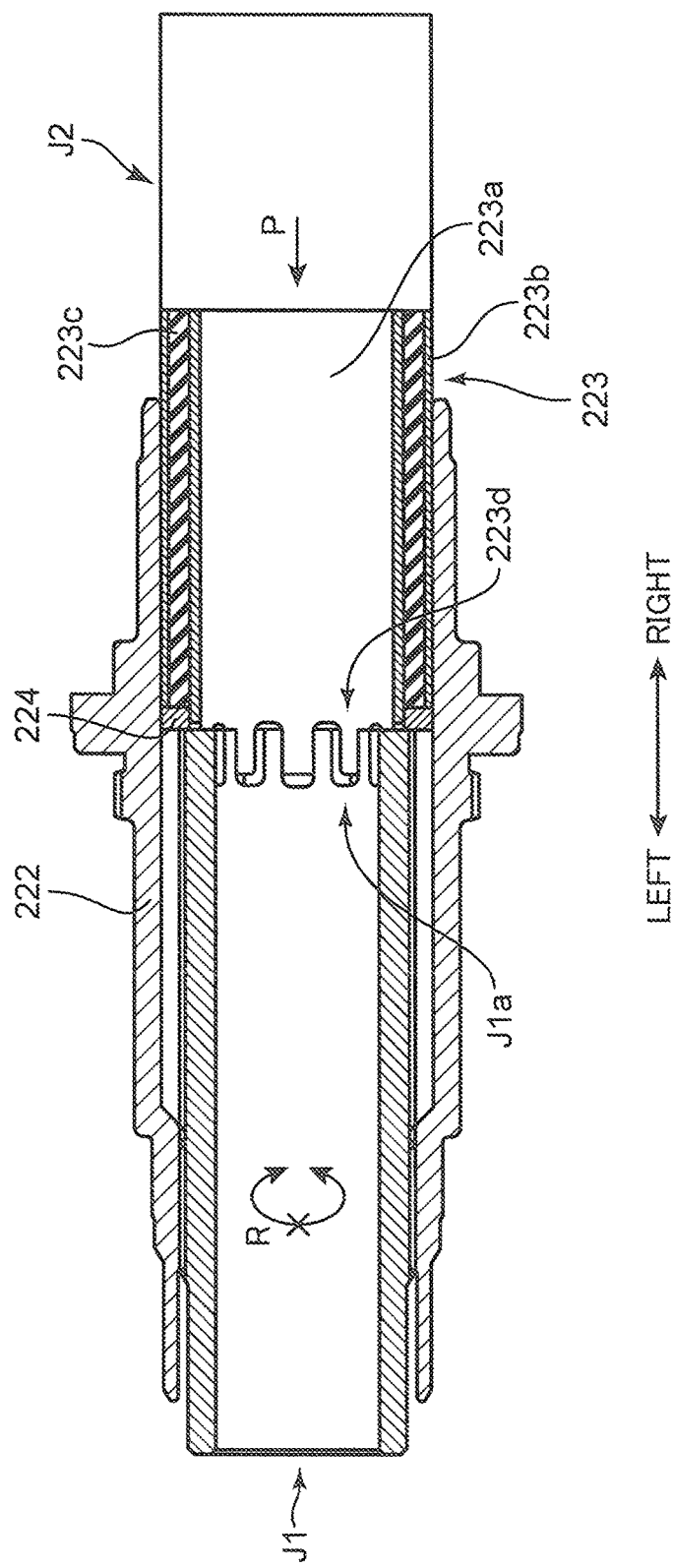
FIG. 5 is a sectional view depicting a process of press-inserting the damper mechanism along an inner peripheral surface of the second shaft member.

As depicted in FIGS. 2, 5 and 6, the second shaft member 222 is formed in a circular tubular shape in which a diameter of an inner peripheral surface (inner diameter) thereof varies between the left end and an axially central to right-end portion thereof (more specifically, the term "axially" means "in an axial direction of the transfer input shaft 22"). Specifically, the left end of the second shaft member 222 is formed such that an inner diameter thereof is slightly greater than an outer diameter of the first shaft member 221. Particularly, as designated by the reference sign A in FIGS. 2 and 6, a portion of the second shaft member 222 which opposely faces an axially central portion of the first shaft member 221 when the first and second shaft members 221, 222 are assembled together to form the transfer input shaft 22 is formed to have an inner diameter that is approximately the same as an outer diameter of the axially central portion of the first shaft member 221. Based on this configuration, centering (center alignment) between the first and second shaft members 221, 222 are performed in the portion A. Further, the central to right-end portion of the second shaft member 222 is formed to have an inner diameter that is greater than the inner diameter of the left end thereof. Accordingly, the central to right-end portion of the second shaft member 222 is formed to have an outer diameter that is greater than an outer diameter of the left end thereof. The transfer drive gear 27 is provided on an outer peripheral surface of a right end-side area of the central portion of the second shaft member 222.

In adjacent relation to the portion A, the second shaft member 222 has internal spline teeth 222$x$ (see FIGS. 3 and 6) formed in an inner peripheral surface of the left end thereof. The internal spline teeth 222$x$ is provided as a means for spline engagement with the external spline teeth 221$x$ at the right end of the first shaft member 221.

Torque from the side of the engine 1 is input into the first shaft member 221 through a spline engagement portion (external spline teeth 221$y$) spline-engaged with the right-side shaft penetration portion 18R of the differential casing 11. When the first and second shaft members 221, 222 are assembled together to form the transfer input shaft 22, the second shaft member 222 is disposed to extend from the right end of the first shaft member 221 in the axial direction of the transfer input shaft 22, i.e., rightwardly in the vehicle width direction. In this state, the second shaft member 222 is coupled to the first shaft member 221 in such a manner as to be relatively rotatable in a circumferential direction (i.e., rotation directions) of the first and second shaft members 221, 222 through a spline engagement region between the first shaft member 221 and the second shaft member 222 (the external spline teeth 221$x$ of the first shaft member 221 and the internal spline teeth 222$x$ of the second shaft member 222).

That is, as depicted in FIG. 3, the first shaft member 221 and the second shaft member 222 are coupled together by means of spline engagement. In this case, a given reference amount of gap is defined between corresponding ones of the external spline teeth 221$x$ of the first shaft member 221 and the internal spline teeth 222$x$ of the second shaft member 222, in a direction of the rotation direction (i.e., circumferential direction). In this way, the first shaft member 221 and the second shaft member 222 are coupled together in a circumferentially relatively rotatable manner.

Further, as depicted in FIG. 3, when the first shaft member 221 and the second shaft member 222 are relatively rotated by a given reference angle $\alpha$, the corresponding ones of the external spline teeth 221$x$ of the first shaft member 221 and the internal spline teeth 222$x$ of the second shaft member 222 come into contact with each other. This means that a restriction section capable of restricting the occurrence of a situation where the first shaft member 221 and the second shaft member 222 are relatively rotated beyond the given reference angle $\alpha$ is formed in a coupling region between the first shaft member 221 and the second shaft member 222, i.e., the spline engagement region between the external spline teeth 221$x$ of the first shaft member 221 and the internal spline teeth 222$x$ of the second shaft member 222.

As described next, the first shaft member 221 and the second shaft member 222 are integrally coupled, respectively, to an inner tube 223$a$ and an outer tube 223$b$ of the damper mechanism 223, and a rubber member (which is equivalent to "elastic member" set forth in the appended claims) 223$c$ is interposed between the inner tube 223$a$ and the outer tube 223$b$. When there is no fluctuation in torque from the side of the engine 1 and the rubber member 223$c$ does not have any torsional displacement in the rotation direction, one of the corresponding ones of the external spline teeth 221$x$ of the first shaft member 221 and the internal spline teeth 222$x$ of the second shaft member 222 is located at a circumferential center of a spline bottom wall of the other. FIG. 3 depicts a state at that time. Then, when a fluctuation in torque from the side of the engine 1 occurs and the rubber member 223$c$ is torsionally displaced in the rotation direction, one of the corresponding ones of the external spline teeth 221$x$ of the first shaft member 221 and the internal spline teeth 222$x$ of the second shaft member 222 is relatively rotated along the spline bottom wall of the other, in a circumferentially rightward direction or a circumferentially leftward direction. FIG. 3 depicts that, irrespective of whether the relative rotation occurs in the circumferentially rightward direction or in the circumferentially leftward direction, it is possible to restrict the occurrence of the situation where the first and second shaft members 221, 222 are relatively rotated beyond the reference angle α which is kept at the same value.

Figure 4:
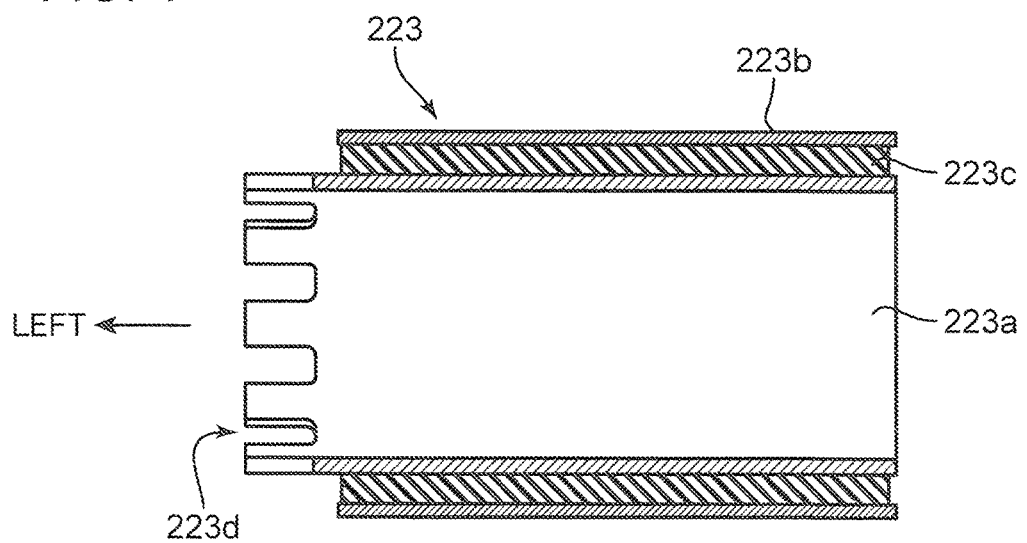
FIG. 4 is a sectional view of a damper mechanism equipped in the power transfer unit.
Figure 8A:
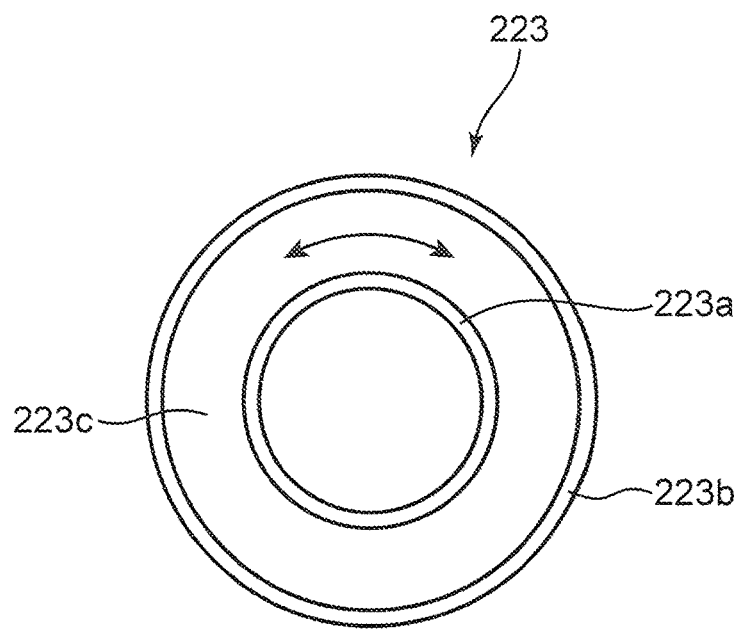
FIGS. 8A and 8B are, respectively, an explanatory diagram of a shear-type damper mechanism and an explanatory diagram of a compression-type damper mechanism.

As depicted in FIG. 4, the damper mechanism 223 comprises an inner tube 223a, an outer tube 223b and a rubber member 223c. This damper mechanism 223 is a shear-type damper mechanism as depicted in FIG. 8A.

As depicted in FIGS. 2, 4 and 6, the inner tube 223a is formed in a circular tubular shape having a smooth (stepless) inner peripheral surface, wherein a diameter of the inner peripheral surface (inner diameter) thereof is slightly greater than the outer diameter of the right-side front-wheel axle 14R (is set in approximately the same manner as that for the inner diameter of the first shaft member 221). The inner tube 223a has comb-like teeth 223d formed in an edge face of a left end thereof (see FIG. 6). The comb-like teeth 223d are provided as a means for press fitting with the comb-like teeth 221a formed in the edge face of the right end of the first shaft member 221 of the transfer input shaft 22. Through this press fitting, the first shaft member 221 and the inner tube 223s are integrally coupled together. When the first and second shaft members 221, 222 are assembled together to form the transfer input shaft 22, the inner tube 223a is disposed to extend from the right end of the first shaft member 221 in the axial direction of the transfer input shaft 22, i.e., rightwardly in the vehicle width direction, at a position radially inside the second shaft member 222.

As depicted in FIGS. 2, 4 and 6, the outer tube 223b is formed in a circular tubular shape having a smooth (stepless) outer peripheral surface, wherein a diameter of the outer peripheral surface (outer diameter) thereof is slightly greater than the inner diameter of the second shaft member 222 of the transfer input shaft 22. Thus, when the outer tube 223b is press-inserted to the inner peripheral surface of the second shaft member 222, the second shaft member 222 and the outer tube 223b are integrally coupled together.

As depicted in FIGS. 2, 4 and 6, the rubber member 223c is formed in a circular tubular shape having a given wall thickness, and interposed between the inner tube 223a and the outer tube 223b in such a manner that an inner peripheral surface thereof is joined to an outer peripheral surface of the inner tube 223a, and an outer peripheral surface thereof is joined to an inner peripheral surface of the outer tube 223b. The rubber member 223c is configured such that, when stress is loaded thereon in the circumferential direction, it is torsionally displaced in the circumferential direction according to its elasticity, and when the stress is removed, the torsional displacement is cancelled out by its elastic restoring force. That is, the circular tubular-shaped rubber member 223c is fixedly attached to the inner tube 223a and the outer tube 223b, wherein a torque fluctuation is absorbed by circumferential shear deformation of the rubber member 223c, as indicated by the arrowed line in FIG. 8A.

The damper mechanism 223 is assembled to the transfer input shaft 22 in a state in which a circumferential phase thereof is matched with that of the first shaft member 221 and the second shaft member 222 of the transfer input shaft 22, in the following manner. As depicted in FIG. 6, the damper mechanism 223 is assembled to the transfer input shaft 22, in such a manner that, when the comb-like teeth 223d of the inner tube 223a is press-fitted with the comb-like teeth 221a of the first shaft member 221, each of the internal spline teeth 222x of the second shaft member 222 integrally coupled to the outer tube 223b is located at the circumferential center of the spline bottom wall of a corresponding one of the external spline teeth 221x of the first shaft member 221, as depicted in FIG. 3.

With reference to FIG. 5, a method for such assembling will be described. FIG. 5 depicts a process of press-inserting the damper mechanism 223 along the inner peripheral surface of the second shaft member 222. The damper mechanism 223 is placed such that the comb-like teeth 223d of the inner tube 223a is positioned on the left side. In this state, the damper mechanism 223 is pushed leftwardly from the right end of the second shaft member 222 to the position depicted in FIG. 6, by a give pushing force P using a jig J2, and press-inserted to the inner peripheral surface of the second shaft member 222. During this operation, if the damper mechanism 223 is deviated in terms of the circumferential phase, when the first shaft member 221 is inserted from the left end of the second shaft member 222, the comb-like teeth 221a of the first shaft member 221 are butted against the comb-like teeth 223d of the inner tube 223a, and precluded from being fitted with the comb-like teeth 223d of the inner tube 223a, in some cases. This is because, when the first shaft member 221 is inserted into the second shaft member 222, the first shaft member 221 is spline-engaged with the second shaft member 222 (the external spline teeth 221x of the first shaft member 221 and the internal spline teeth 222x of the second shaft member 222 are engaged with each other), so that a circumferential position of the first shaft member 221 becomes restricted. On the other hand, even if the comb-like teeth 221a of the first shaft member 221 can be fitted with the comb-like teeth 223d of the inner tube 223a when the first shaft member 221 is inserted into the second shaft member 222, one of the corresponding ones of the external spline teeth 221x of the first shaft member 221 and the internal spline teeth 222x of the second shaft member 222 is likely to be located offset from the circumferential center of the spline bottom wall of the other. This is a situation where the reference angle α undesirably varies between when the relative rotation occurs in the circumferentially rightward direction and when the relative rotation occurs in the circumferentially leftward direction, in FIG. 3.

For this reason, a jig J1 is used to adequately set the circumferential phase of the damper. The jig J1 is configured to be spline-engaged with the internal spline teeth 222x of the second shaft member 222 in a relatively non-rotatable manner. Further, the jig J1 comprises comb-like teeth J1a press-fittable with the comb-like teeth 223d of the inner tube 223a. In the operation of press-inserting the damper mechanism 223, first of all, the comb-like teeth J1a of the Jig J1 and the comb-like teeth 223d of the inner tube 223a are preliminarily press-fitted with each other. In this state, the resulting assembly is inserted from the right end of the second shaft member 222 while placing the jig J1 at a leading end of the assembly, to cause the jig J1 to be spline-engaged with the internal spline teeth 222x of the second shaft member 222. Through this spline engagement, a circumferential rotation R of the jig J1 and the inner tube 223a is inhibited. In this state, by using the jug J2, the damper mechanism 223 is pushed to the position depicted in FIG. 6, and press-inserted to the inner peripheral surface of the second shaft member 222.

Subsequently, the jig J1 is detached from the inner tube 223a. As depicted in FIG. 5, the jig J1 has a relatively thick peripheral wall, i.e., the peripheral wall of the jig J1 protrudes radially inwardly with respect to the inner tube 223a of the damper mechanism 223, so that the jig J1 can be readily detached by striking the protruded portion from the right side. Then, in place of the jig J1, the first shaft member 221 is inserted into the second shaft member 222, and the comb-like teeth 221a of the first shaft member 221 are press-fitted with the comb-like teeth 223d of the inner tube 223a. This allows one of the corresponding ones of the external spline teeth 221x of the first shaft member 221 and the internal spline teeth 222x of the second shaft member 222 to be located at the circumferential center of the spline bottom of the other.

In FIG. 6, the reference sign "225" denotes a snap ring for retaining the first shaft member 221. In FIGS. 5 and 6, the reference sign "224" denotes a spacer for pushing the damper mechanism 223 press-inserted once, from the left side using the jig J1 to thereby detach the damper mechanism 223 from the second shaft member 222. That is, as depicted in FIG. 5, when the jig J1 pushes the damper mechanism 223 through the spacer 224, the jig J1 can simultaneously push not only the inner tube 223a of the damper mechanism 223 but the outer tube 223b press-inserted to the inner peripheral surface of the second shaft member 222. This makes it possible to avoid a situation where an excessive axial shear stress (more specifically, the term "axial" direction means the axial direction of the transfer input shaft 22) acts on the rubber member 223c interposed between the inner tube 223a and the outer tube 223b, and thereby to protect the rubber member 223c.

As depicted in FIG. 2, in a state in which the damper mechanism 223 is assembled to the transfer input shaft 22 and equipped in the transfer 20, the damper mechanism 223 is disposed such that at least a part (more specifically, an intermediate portion and a left end-side portion, except for a right end-side portion) thereof overlaps the transfer driven gear 28 in an extension direction of the transfer output shaft 25 (i.e., the vehicle front-rear direction), in top plan view. Particularly, in this embodiment, the damper mechanism 223 is disposed such that the intermediate portion and the left end-side portion thereof overlap the transfer output shaft 25 having a diameter less than that of the transfer driven gear 28 in the extension direction of the transfer output shaft 25, in top plan view.

More specifically, in this embodiment, the transfer drive gear 27 is provided on the outer peripheral surface of the right end-side area of the central portion of the second shaft member 222 (i.e., a right end of the transfer input shaft 22), as mentioned above. In other words, the transfer drive gear 27 is disposed relatively away from a left end of the transfer input shaft 22. Thus, an axial distance between the left end of the transfer input shaft 22 and the transfer drive gear 27 is set to a relatively large value. Then, the transfer output shaft 25 and the transfer driven gear 28 are disposed in such a relatively laterally-long space, and the damper mechanism 223 is disposed such that it overlaps the transfer driven gear 28 in the vehicle front-rear direction, in top plan view. In particular, the damper mechanism 223 is disposed such that it overlaps the transfer output shaft 25 having a diameter less than that of the transfer driven gear 28.

(3) Functions/Effects of Embodiment

As above, in the first embodiment, the transfer 20 for transferring power from the front wheel side to the rear wheel side comprises: the hollow transfer input shaft 22 which is coupled to the engine 1 and through which the right-side front-wheel axle 14R is penetrated; the transfer output shaft 25 disposed to extend in a direction orthogonal to the transfer input shaft 22; the transfer drive gear 27 provided on the outer periphery of the transfer input shaft 22; and the transfer driven gear 28 provided on the outer periphery of the transfer output shaft 25 and meshed with the transfer drive gear 27. It further comprises the damper mechanism 223 configured to absorb a fluctuation in torque input from the side of the engine 1 into the transfer input shaft 22. The damper mechanism 223 is disposed such that the intermediate portion and the left end-side portion (except for the right end-side portion) thereof overlap the transfer driven gear 28 in the extension direction of the transfer output shaft 25, in top plan view.

According to this feature, the intermediate portion and the left end-side portion of the damper mechanism 223 overlap the transfer driven gear 28 in the extension direction of the transfer output shaft 25, in top plan view, so that it becomes possible to suppress an increase in dimension of the transfer 20 in the axial direction, as compared, for example, to the case where the damper mechanism 223 and the transfer driven gear 28 are arranged side-by-side in the axial direction of the transfer input shaft (i.e., vehicle width direction) as in the aforementioned Patent Literature 1. This provides an advantage of being able to not only suppress deterioration in mountability, but also maintain compatibility with a transfer 20 devoid of the damper mechanism 223, in terms of the transfer casing 21. According to the above feature, it also becomes possible to ensure a layout space for the damper mechanism 223 without axially enlarging the transfer casing 21. This makes it possible to suppress the occurrence of gear rattle between the transfer drive gear 27 and the transfer driven gear 28, with a compact structure. Therefore, according to the first embodiment, it becomes possible to provide a transfer 20 which is suppressed in terms of increase in axial dimension.

Specifically, the transfer 20 can be equipped with the damper mechanism 223, without causing protrusion from an occupancy space of a transfer 20 devoid of the damper mechanism 223. In other words, for ensuring a layout space for the damper mechanism 223, it is not necessary to increase the axial dimension of the transfer input shaft 22. This makes it possible to avoid the increase in axial dimension of the transfer casing 21.

Particularly, in the first embodiment, the damper mechanism 223 is disposed such that the intermediate portion and the left end-side portion thereof overlap the transfer output shaft 25 having a diameter less than that of the transfer driven gear 28, in the extension direction of the transfer output shaft 25, in top plan view.

According to this feature, it becomes possible to further reduce the axial dimension of the transfer 20.

In the first embodiment, the damper mechanism 223 is provided in the internal space X between the outer periphery of the right-side front-wheel axle 14R penetrated through the transfer input shaft 22, and the inner periphery of the transfer input shaft 22.

According to this feature, the damper mechanism 223 is provided in the internal space X of the hollow transfer input shaft 22, so that it becomes possible to ensure the layout space for the damper mechanism 223 by utilizing the internal space X of the transfer input shaft 22 without enlarging the transfer casing 21 radially outwardly, as compared to the case where the damper mechanism 223 is disposed on the outer periphery of the transfer input shaft 22. This makes it possible to suppress the occurrence of gear rattle between the transfer drive gear 27 and the transfer driven gear 28, with a compact structure.

In addition, a member like the transfer drive gear is not installed in the internal space X of the transfer input shaft 22, so that it becomes possible to sufficiently increase a length of the damper mechanism 223 in the axial direction to thereby sufficiently reduce a stress to be loaded on the damper mechanism 223.

Therefore, according the first embodiment it becomes possible to compactly equip a transfer 2 with the damper mechanism 223 by utilizing the internal space X of the hollow transfer input shaft 22. As a result, it becomes possible to provide a transfer 20 capable of sufficiently enlarging the damper mechanism 223 to sufficiently suppress gear rattle between the gears 27, 28, without causing an increase in size of the transfer casing 21.

In the first embodiment, the transfer input shaft 22 comprises the first shaft member 221 configured to receive an input of torque from the side of the engine 1, and the second shaft member 222 disposed to extend axially from the right end of the first shaft member 221. The second shaft member 222 is coupled to the first shaft member 221 in a circumferentially relatively rotatable manner, wherein the transfer drive gear 27 is provided on the outer periphery of the second shaft member. Further, the damper mechanism 223 comprises: the inner tube 223a disposed to extend axially from the right end of the first shaft member 221 at a position radially inside the second shaft member 222 and integrally coupled to the first shaft member 221; the outer tube 223b coupled to the inner peripheral surface of the second shaft member 222 integrally with the second shaft member 222; and the rubber member 223c interposed between the inner tube 223a and the outer tube 223b.

According to this feature, the first shaft member 221 and the second shaft member 222 of the transfer input shaft 22 are coupled to each other through the rubber member 223c in a relatively rotatable manner, so that a fluctuation in torque from the side of the engine 1 is absorbed by a torsional displacement (i.e., shear deformation) of the rubber member 223c in the rotation direction. In addition, a length of the rubber member 223c can be increased in the axial direction so as to reduce a stress to be loaded on the rubber member 223c. In this case, torque input into the first axial member 221 is directed to flow axially in the internal space X of the transfer input shaft 22, and transferred to the inner tube 223a of the damper mechanism 223. Then, it is directed to flow through the rubber member 223c and the outer tube 223b of the damper mechanism 223 outwardly from a radially inward side thereof, and transferred to the second shaft member 222. This direction of torque flow is significantly different from the direction of torque flow in the aforementioned Patent Literature 1 in which the damper mechanism is provided on the outer periphery of the transfer input shaft.

In the first embodiment, a coupling region between the first shaft member 221 and the second shaft member 222, i.e., the spline engagement region between the external spline teeth 221x of the first shaft member 221 and the internal spline teeth 222x of the second shaft member 222, is provided with the restriction section configured to restrict the occurrence of a situation where the first and second shaft members 221, 222 are relatively rotated beyond the given reference angle α.

According to this feature, an excessive torsional displacement of the rubber member 223c can be prevented. This makes it possible to suppress damage to the rubber member 223c, and thus improve durability of the damper mechanism 223.

In the first embodiment, the first shaft member 221 and the second shaft member 222 are coupled together by means of spline engagement, and configured such that a given reference amount of gap is defined between corresponding ones of the external spline teeth 221x of the first shaft member 221 and the internal spline teeth 222x of the second shaft member 222, in the rotation direction, and, when the first shaft member 221 and the second shaft member 222 are relatively rotated by the reference angle α, the corresponding ones of the external spline teeth 221x of the first shaft member 221 and the internal spline teeth 222x of the second shaft member 222 come into contact with each other. Thus, this configuration makes up the restriction section configured to restrict the occurrence of the situation where the first and second shaft members 221, 222 are relatively rotated beyond the given reference angle α.

According to this feature, by the contact between the corresponding spline teeth 221x, 222x, it becomes possible to stably and reliably restrict the occurrence of the situation where the first and second shaft members 221, 222 are relatively rotated beyond the given reference angle α. In addition, each length of the spline teeth 221x, 222x can be increased in the axial direction so as to reduce a stress to be loaded on the spline teeth 221x, 222x. During the contact between the corresponding spline teeth 221x, 222x, torque input into the first shaft member 221 is directed to flow through the spline engagement region between the first and second shaft members 221, 222 in the internal space X of the transfer input shaft 22 outwardly from a radially inward side thereof, and transferred to the second shaft member 222. This direction of torque flow is also significantly different from the direction of torque flow in the aforementioned Patent Literature 1 in which the damper mechanism is provided on the outer periphery of the transfer input shaft.

As mentioned above, in the first embodiment, it becomes possible to avoid an increase in size of the transfer casing 21 even after equipping the transfer 20 with the damper mechanism. Therefore, it becomes possible to share the transfer casing 21 with a transfer 20 devoid of the damper 223. That is, it becomes possible to maintain compatibility in terms of the transfer casing 21.

Figure 7:
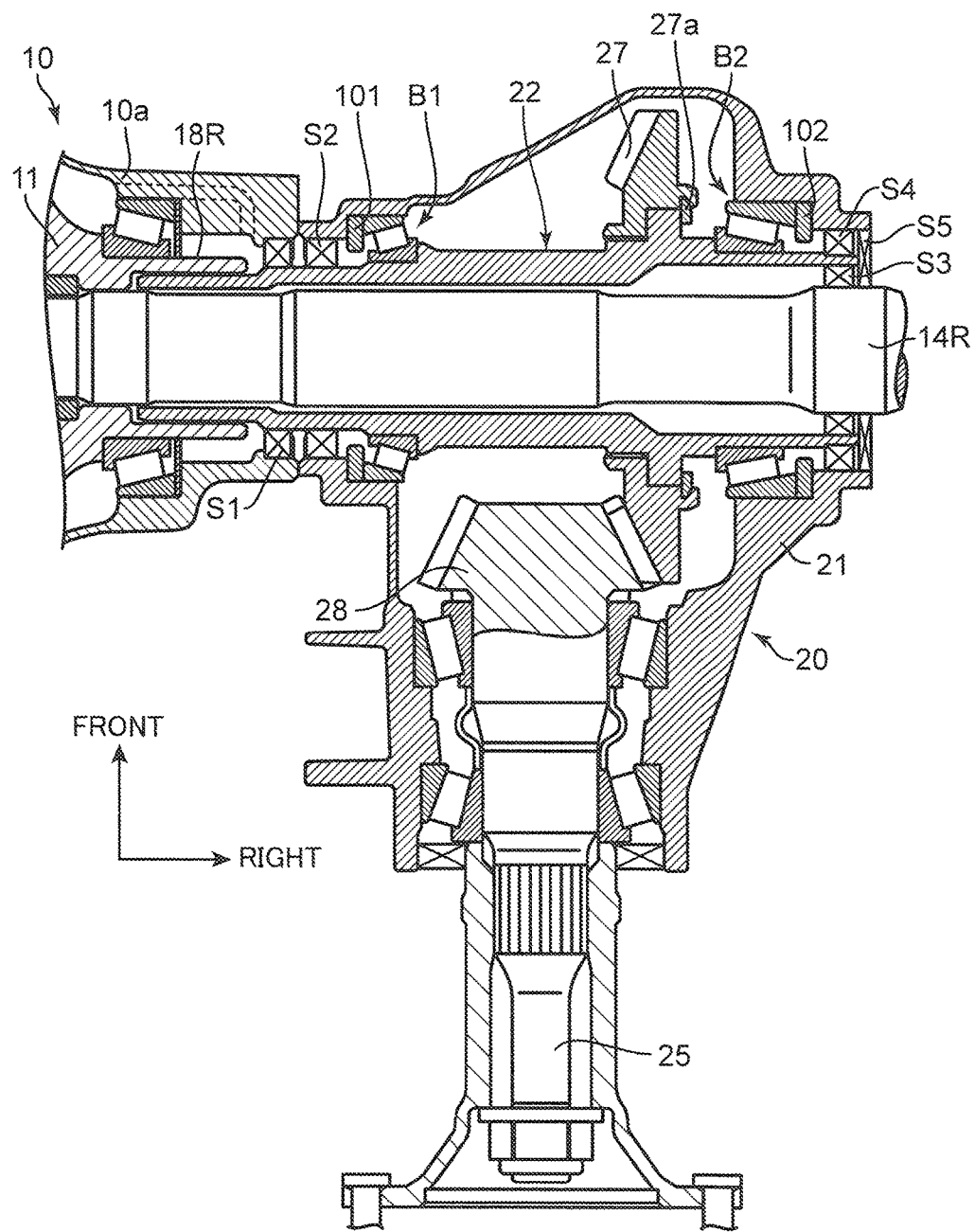
FIG. 7 is a top plan sectional view corresponding to FIG. 2, depicting a power transfer unit devoid of the damper mechanism.

Specifically, FIG. 7 is a view corresponding to FIG. 2, depicting a transfer 20 devoid of the damper mechanism 223. As is apparent from comparison between FIGS. 2 and 7, in FIG. 7, a section corresponding to the first shaft member 221, the second shaft member 222 and the damper mechanism 223 in FIG. 2, i.e., a section corresponding to the transfer input shaft 22 having the damper mechanism 223 assembled thereto, in FIG. 2, is replaced with a single type transfer input shaft 22, but the remaining configuration is not changed at all.

That is, in addition to sharing of the transfer casing 21, it becomes possible to sharingly use various other members, such as a sealing member S1 for oil-tightly sealing a differential housing 10a, a sealing member S2 for oil-tightly sealing the left end of the transfer casing 21, sealing members S3, S4 for oil-tightly sealing the right end of the transfer casing 21, a sealing member S5 for gas-tightly sealing the right end of the transfer casing 21, a pair of left and right thrust bearings B1, B2 for supporting the left and right ends of the transfer input shaft 22, respectively, while generating a thrust force toward an axially central region of the transfer input shaft 22, and shims 101, 102 for adjusting axial positions of the thrust bearings B1, B2 and thus an axial position of the transfer drive gear 27 to thereby adjust a mesh engagement with the transfer driven gear 28. Therefore, it becomes possible to achieve a significant reduction in cost, as compared to the case where changes to the specifications are made between the transfer 20 equipped with the damper mechanism 223 and a transfer 20 devoid of the damper mechanism 223.

In the first embodiment, the snap ring 27a (see FIG. 2) for coupling the transfer drive gear 27 to the outer periphery of the transfer input shaft 22 has a taper surface. This taper surface is formed such that a thickness of the snap ring 27a gradually increases in a radially outward direction of the snap ring 27a, so as to allow the transfer drive gear 27 to be more strongly joined to the transfer input shaft 22.

Thus, during transferring of power, according to rotation of the transfer input shaft 22, a centrifugal force is generated in the radially outward direction of the snap ring 27a, and thereby this centrifugal force and a biasing force of the snap ring 27a are applied to a mounting portion of the snap ring 27a in the radially outward direction. This makes it possible to reliably prevent dropout of the snap ring 27a.

(4) Modifications

In the first embodiment, the transfer 20 is designed to transfer power from the front wheel side to the rear wheel side. Alternatively, the present invention can also be applied to a transfer designed to transfer power in the reverse direction, i.e., from the rear wheel side to the front wheel side.

In the first embodiment, the transfer drive gear 27 is provided on the right end of the transfer input shaft 22 (at a position adjacent to the right thrust bearing B2). Alternatively, it may also be provided on the opposite end, i.e., the left end of the transfer input shaft 22 (at a position adjacent to the left thrust bearing B), as long as at least a part of the damper mechanism 223 overlaps the transfer driven gear 28 in the extension direction of the transfer output shaft 25, in top plan view.

In the first embodiment, a hypoid gear set is employed as the transfer drive gear 27 and the transfer driven gear 28. However, the present invention is not limited thereto. For example, any type of bevel gear set other than the hypoid gear set may also be employed.

Figure 8B:
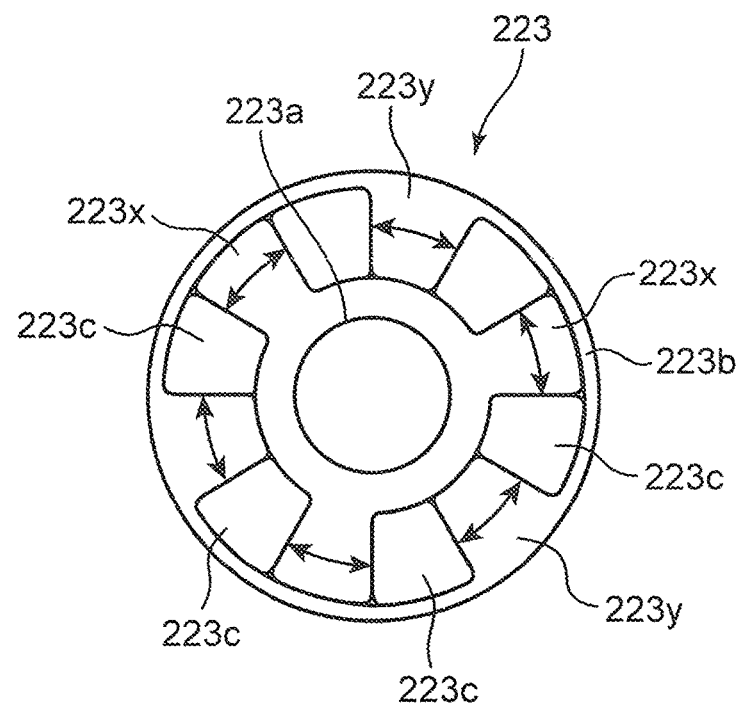

In the first embodiment, a shear-type damper mechanism is employed as the damper mechanism 223. However, the present invention is not limited thereto. For example, a compression-type damper mechanism as depicted in FIG. 8B may also be employed. The following description will be made while the same reference sign as that in FIG. 8A is assigned to an element or component identical or similar to that in FIG. 8A. As with the shear type, the compression-type damper mechanism comprises an inner tube 223a, an outer tube 223b and a rubber member 223c. Differently, a plurality of (in the depicted example, three) wall potions (inner-tube pressure wall portions) 223x are provided on an outer peripheral surface of the inner tube 223a at even intervals (in the depicted example, at intervals of 120°) in a circumferential direction of the damper mechanism to protrude outwardly, and a plurality of (in the depicted example, three) wall potions (outer-tube pressure wall portions) 223y are provided on an inner peripheral surface of the outer tube 223b at even intervals (in the depicted example, at intervals of 120°) in the circumferential direction to protrude inwardly. Each of the inner-tube pressure wall portions 223x and the outer-tube pressure wall portions 223y is formed to extend in an axial direction of the damper mechanism, and they are arranged alternately in the circumferential direction.

The rubber member 223c is formed in a bar shape and disposed to extend in the axial direction, wherein it has a cross-sectional shape and a cross-sectional area capable of filling a space defined between adjacent ones of the inner-tube pressure wall portions 223x and the outer-tube pressure wall portions 223y when the inner-tube pressure wall portions 223x and the outer-tube pressure wall portions 223y are alternately arranged at even intervals (in the depicted example, at intervals of 60°) in the circumferential direction. The rubber member 223c is interposed between the adjacent ones of the inner-tube pressure wall portions 223x and the outer-tube pressure wall portions 223y, in a slightly compressed state. That is, a plurality of (in the depicted example, six) bar-shaped are used for one compression-type damper mechanism 223 to absorb torque fluctuations by compressive deformation of the rubber members 223c in the circumferential direction, as indicated by the arrowed lines in FIG. 8B.

<Second Embodiment>

Figure 10:
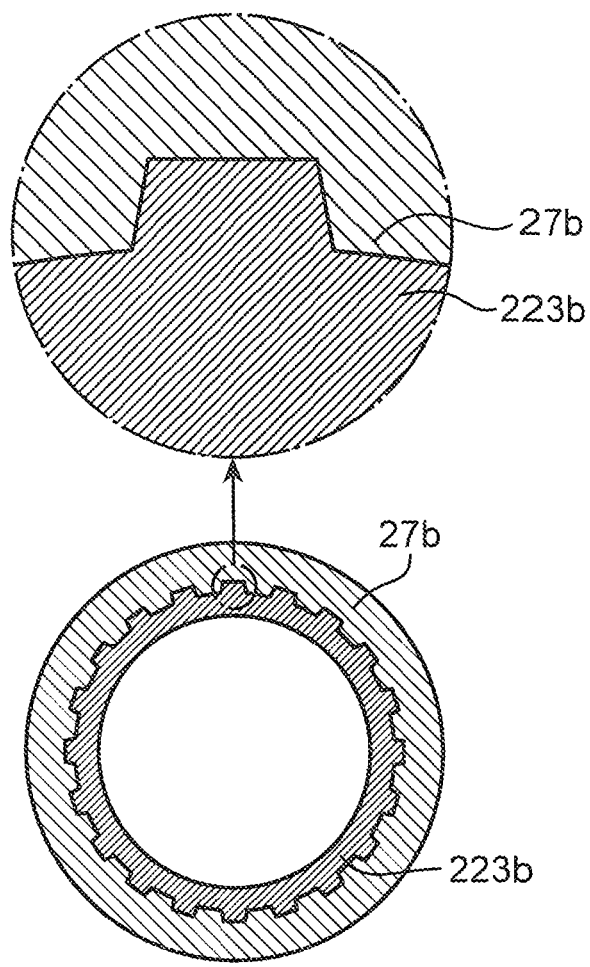
FIG. 10 is a sectional view taken along the line X-X in FIG. 9.

Next, with reference to FIGS. 9 to 11, a second embodiment of the present invention will be described. In these figures, an element or component identical or similar to that in the first embodiment is assigned with the same reference sign as that in the first embodiment. Thus, description about the same configuration as that in the first embodiment will be omitted, and only a configuration different from that in the first embodiment will be described below.

In terms of configuration, the second embodiment is different from the first embodiment in that a damper mechanism 223 is provided on an outer periphery of a transfer input shaft 22, as depicted in FIG. 9. On the other hand, in terms of configuration, the second embodiment is identical to the first embodiment in that at least a part (in the depicted embodiment, entirety) of the damper mechanism 223 overlaps a transfer driven gear 28 in an extension direction of a transfer output shaft 25, in top plan view.

The configuration in which the damper mechanism 223 is provided on the outer periphery of the transfer input shaft 22 has an advantage of being able to facilitate assembling, as compared to the case where it is provided in the internal space X of the transfer input shaft 22, as in the first embodiment.

In the second embodiment, the transfer input shaft 22 is a single type. A front differential 10 is disposed on one side (in the depicted embodiment, left side) of the damper mechanism 223 in an axial direction of the transfer input shaft 22, and a transfer drive gear 27 is disposed on the other side (in the depicted embodiment, right side) of the damper mechanism 223. That is, the damper mechanism 223 is disposed on the transfer input shaft 22 at a position between the front differential 10 on the left side thereof and the transfer drive gear 27 on the right side thereof.

By disposing the damper mechanism 223 in this manner, it becomes possible to allow the damper mechanism 223 to easily overlay the transfer driven gear 28 disposed between the front differential 10 and the transfer drive gear 27.

It should be understood that the front differential 10 may be disposed on the right side of the damper mechanism 223 and the transfer drive gear 27 may be disposed on the left side of the damper mechanism 223.

In the second embodiment, the damper mechanism 223 is disposed such that an outwardmost periphery (in the depicted embodiment, an outer peripheral surface of an outer tube 223b) thereof is located radially inwardly with respect to an inwardmost periphery (in the depicted embodiment, an inner peripheral surface of a circular tubular-shaped boss 27b) of the transfer drive gear 27. Specifically, the transfer drive gear 27 has a circular tubular-shaped boss 27b for assembling to the outer periphery of the transfer input shaft 22, wherein an inner peripheral surface of the circular tubular-shaped boss 27b corresponds to a portion of the transfer drive gear 27 located on a radially inwardmost side.

By disposing the damper mechanism 223 in the above manner, it becomes possible to reduce a radial dimension of the damper mechanism 223 and the vicinity thereof.

In the second embodiment, the damper mechanism 223 is a shear-type damper mechanism as illustrated in FIG. 8A, as with the first embodiment. An inner tube 223a of the damper mechanism 223 is coupled to an outer peripheral surface of the transfer input shaft 22 integrally with the transfer input shaft 22, for example, by means of press-insertion. As depicted in FIG. 10, the outer tube 223b of the damper mechanism 223 is coupled to an inner peripheral surface of the transfer drive gear 27 (more specifically, the inner peripheral surface of the circular tubular-shaped boss 27b) integrally with the transfer drive gear 27, by means of spline engagement. Specifically, FIG. 10 depicts a state of relatively non-rotatable spline engagement between the circular tubular-shaped boss 27b of the transfer drive gear 27 and the outer tube 223b of the damper mechanism 223. A rubber member 223c of the damper mechanism 223 is interposed between the inner tube 223a and the outer tube 223b.

Figure 11:
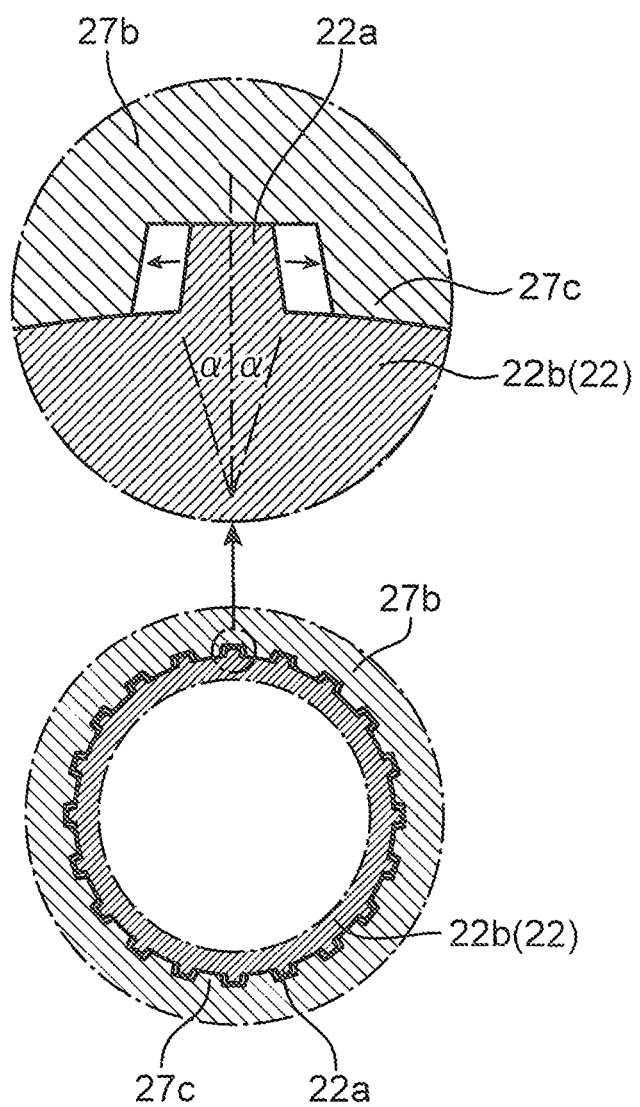
FIG. 11 is a sectional view taken along the line XI-XI in FIG. 9.

As depicted in FIG. 11, the transfer input shaft 22 has external spline teeth (which is equivalent to "first engagement portion" set forth in the appended claims) 22a provided in the outer peripheral surface thereof (more specifically, an outer peripheral surface of a stepped portion 22b of the transfer input shaft 22 corresponding to the circular tubular-shaped boss 27b of the transfer drive gear 27), and the transfer drive gear 27 has internal spline teeth (which is equivalent to "second engagement portion" set forth in the appended claims) 27c provided in the inner peripheral surface thereof (more specifically, the inner peripheral surface of the circular tubular-shaped boss 27b). The external spline teeth 22a and the internal spline teeth 27c are mutually coupled in a circumferentially relatively rotatable manner. Specifically, FIG. 11 depicts a state of relatively rotatable spline engagement between the circular tubular-shaped boss 27b of the transfer drive gear 27 and the transfer input shaft 22. This provides a restriction section configured to restrict the occurrence of a situation where the external spline teeth 22a and the internal spline teeth 27c are relatively rotated beyond a given reference angle α, as with the first embodiment.

According to the above feature, the transfer drive gear 27 can be utilized to form a restriction section configured to restrict the occurrence of a situation where the transfer input shaft 22 and the transfer drive gear 27 are relatively rotated beyond the given reference angle α, to thereby prevent an excessive torsional displacement of the rubber member 223c. This makes it possible to suppress damage to the rubber member 223c, and thus improve durability of the damper mechanism 223.

<Third Embodiment>

Next, with reference to FIG. 12, a third embodiment of the present invention will be described. In this figure, an element or component identical or similar to that in the second embodiment is assigned with the same reference sign as that in the second embodiment. Thus, description about the same configuration as that in the second embodiment will be omitted, and only a configuration different from that in the second embodiment will be described below.

In terms of configuration, the third embodiment is different from the second embodiment in that a damper mechanism 223 is a compression type as depicted in FIG. 8B. On the other hand, in terms of configuration, the third embodiment is identical to the second embodiment in that the damper mechanism 223 is provided on an outer periphery of a transfer input shaft 22.

Figure 12:
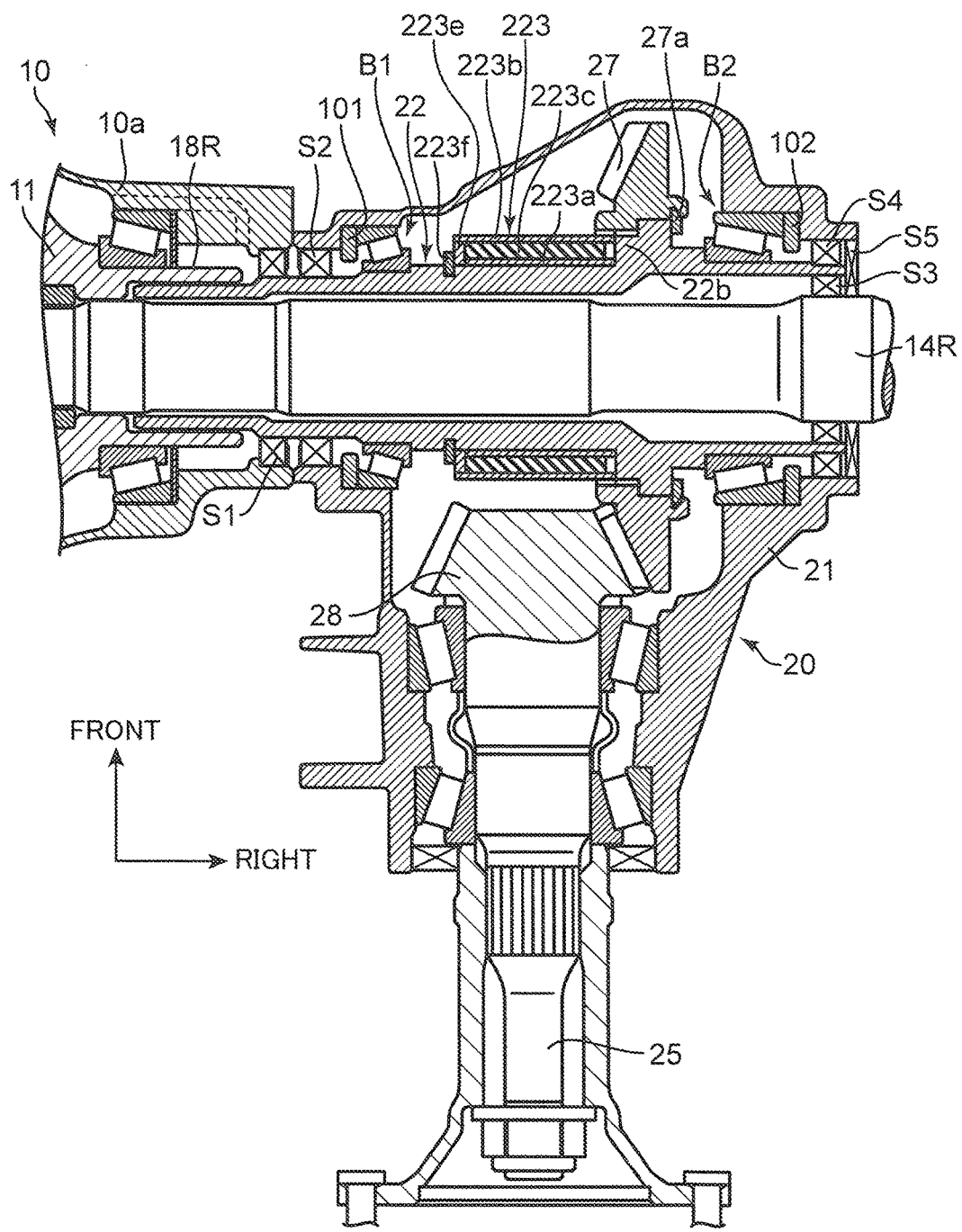
FIG. 12 is a top plan sectional view corresponding to FIG. 2, depicting a power transfer unit according to a third embodiment of the present invention.

As depicted in FIG. 12, a circular ring-shaped washer 223e is installed at a left end of the damper mechanism 223, and fixed to an outer peripheral surface of a transfer input shaft 22 by a snap ring 223f. This washer 223e is used roughly for the following reason. As mentioned above, in the compression-type damper mechanism 223, each of the rubber members 223c is interposed between adjacent ones of the inner-tube pressure wall portions 223x and the outer-tube pressure wall portions 223y, without being fixed thereto. Thus, during torque fluctuations, the rubber member 223c located on a non-compression side can slip out from between adjacent ones of the wall portions 223x, 223y, due to an increase in distance between the adjacent wall portions 223x, 223y, or the rubber member 223c located on a compression side can be pushed out from between the adjacent wall portions 223x, 223y, due to a thrust force applied thereto in an axial direction thereof. Therefore, in order to prevent the occurrence of the above situations, the left end of the damper mechanism 223 in an open state is closed by the washer 223e (a right end of the damper mechanism 223 is closed by a stepped portion 22b of the transfer input shaft 22 provided with external spline teeth 22a).

In the third embodiment, an excessive compression of the rubber member 223c is prevented by the restriction section. This makes it possible to prevent an excessive increase in deformation amount of the rubber member 223c to thereby suppress deterioration in usable life, and thus reduce property degradation and breakage of the damper mechanism 223 to thereby maintain durability of the damper mechanism 223.

<Fourth Embodiment>

Next, with reference to FIGS. 13 to 17, a fourth embodiment of the present invention will be described. In the figures, an element or component identical or similar to that in the first embodiment is assigned with the same reference sign as that in the first embodiment. Thus, description about the same configuration as that in the first embodiment will be omitted, and only a configuration different from that in the first embodiment will be described below.

The fourth embodiment is intended for a transfer 20 improved in assemblability. It is also intended for a production method for the transfer 20, excellent in productivity.

Figure 13:
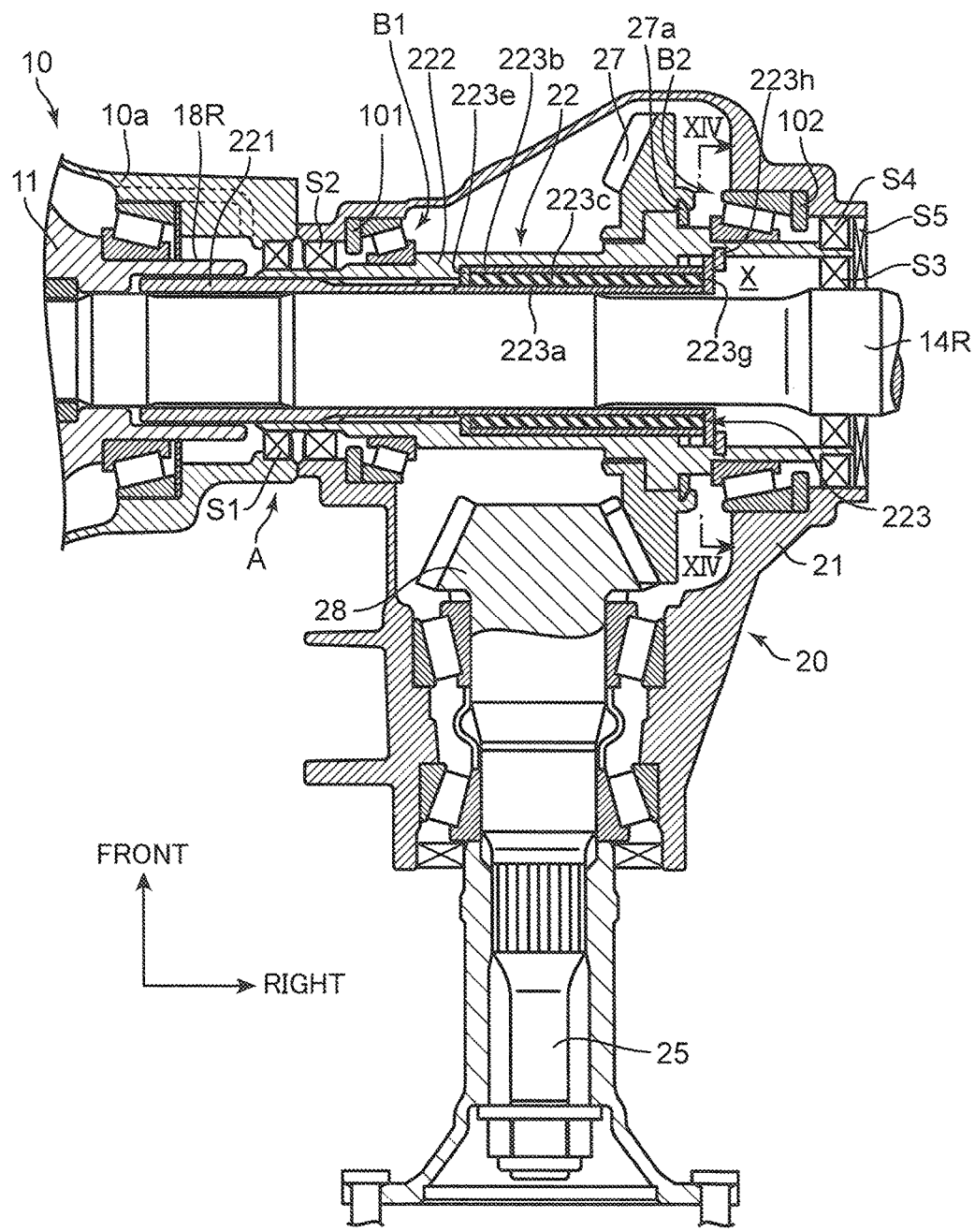
FIG. 13 is a top plan sectional view corresponding to FIG. 2, depicting a power transfer unit according to a fourth embodiment of the present invention.
Figure 14:
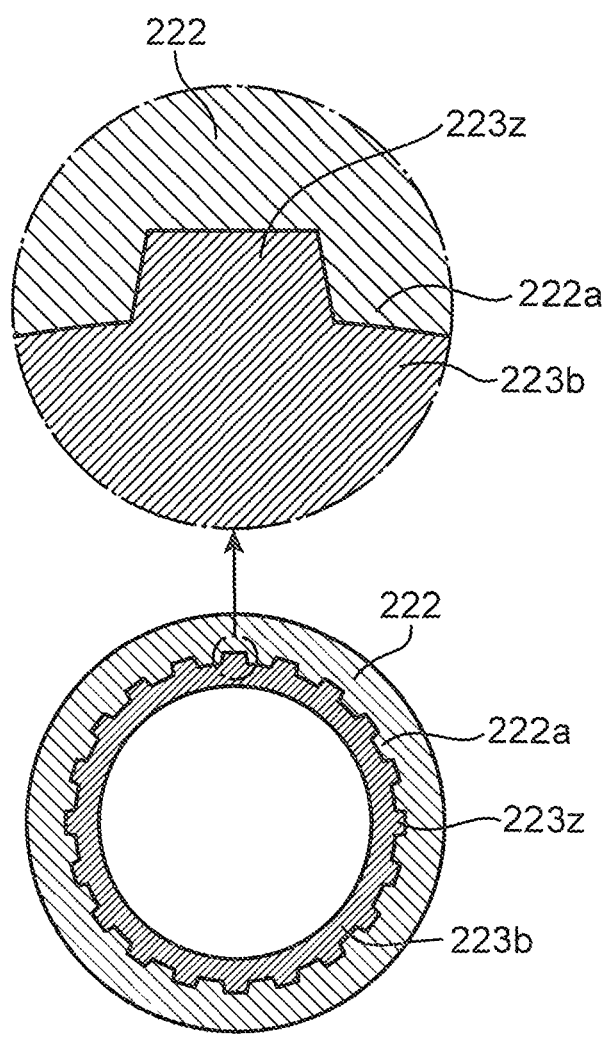
FIG. 14 is a sectional view taken along the line XIV-XIV in FIG. 13.

In the fourth embodiment, a damper mechanism 223 is a compression-type damper mechanism as depicted in FIG. 8B, as with the third embodiment. As depicted in FIGS. 13 and 14, an outer tube 223b of the damper mechanism 223 has an outer peripheral spline (which is equivalent to "first fitting portion" set forth in the appended claims) 223z provided at a right-end region of an outer peripheral surface thereof, and a second shaft member 222 of a transfer input shaft 22 has an inner peripheral spline (which is equivalent to "second fitting portion" set forth in the appended claims) 222a provided right-end region of an inner peripheral surface thereof. The outer peripheral spline 223z and the inner peripheral spline 222a are mutually fitted in a relatively non-rotatable manner to thereby integrally couple the outer tube 223b and the second shaft member 222 together. In this case, the outer tube 223b and the second shaft member 222 are integrally couple together in such a manner as to, when a first shaft member 221 of the transfer input shaft 22 is integrally coupled to an inner tube 223a of the damper mechanism 223 including the outer tube 223b, allow a restriction section to be provided in a coupling region between the first and second shaft members 221, 222 (in a spline engagement region between corresponding ones of external spline teeth 221x of the first shaft member 221 and internal spline teeth 222x of the second shaft member 222), i.e., allow a reference amount of gap to be defined between the corresponding ones of the external spline teeth 221x of the first shaft member 221 and the internal spline teeth 222x of the second shaft member 222.

Figure 16:
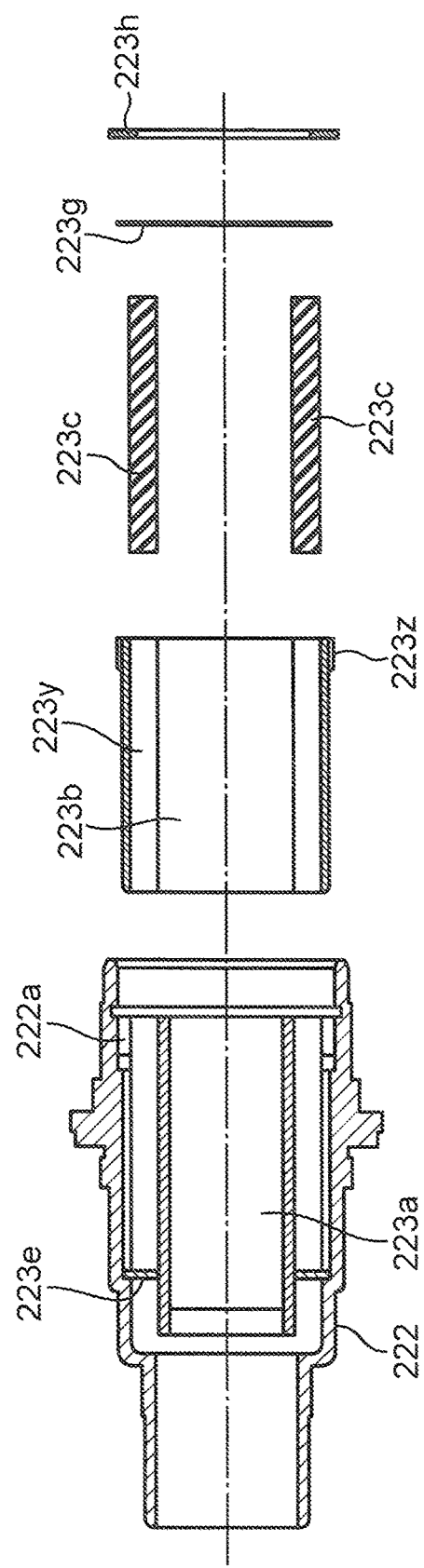
FIG. 16 is a sectional view depicting a first coupling step during assembly of the power transfer unit according to the fourth embodiment.
Figure 17:
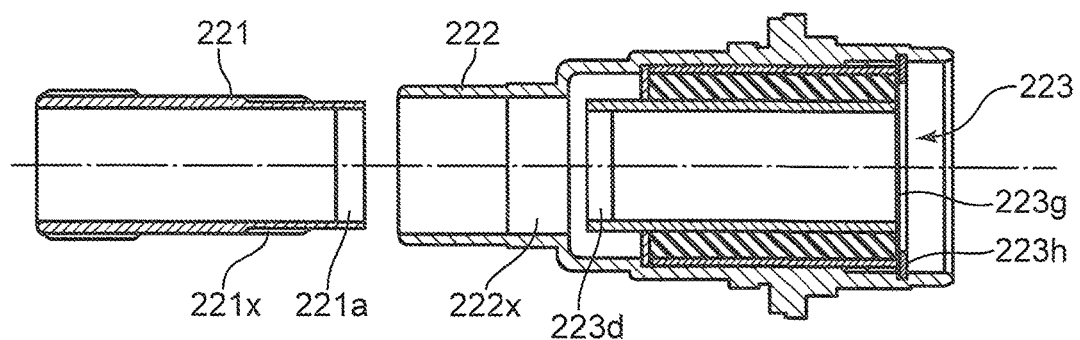
FIG. 17 is a sectional view depicting a second coupling step during the assembly of the power transfer unit according to the fourth embodiment.

The above point will be further discussed in detail by describing a production method for the transfer 20 according to the fourth embodiment below based on assembling process diagrams in FIGS. 15 to 17. The production method for the transfer 20 according to the fourth embodiment is characterized in that it comprises: a first coupling step (FIG. 16) of mutually fitting the outer peripheral spline 223z of the outer tube 223b of the damper mechanism 223 and the inner peripheral spline 222a of the second shaft member 222 of the transfer input shaft 22 to thereby integrally couple the outer tube 223b and the second shaft member 222 together, and a second coupling step (FIG. 17) of, after the first coupling step, integrally coupling the first shaft member 221 and the inner tube 223a of the damper mechanism 223 including the outer tube 223b, in such a manner as to provide the restriction section in the coupling region between the first shaft member 221 and second shaft member 222 (the external spline teeth 221x and the internal spline teeth 222x).

Figure 15:
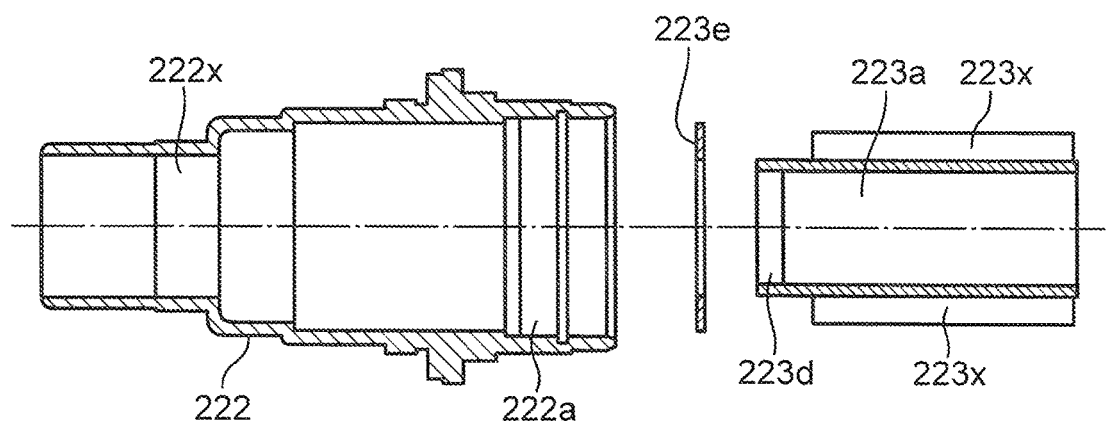
FIG. 15 is an exploded sectional view of a pre-assembly state of the power transfer unit according to the fourth embodiment.

First of all, referring to FIG. 15, the inner tube 223a of the damper mechanism 223 is placed such that comb-like teeth 223d thereof are located on the left side, and then inserted into the second shaft member 222, from a right end of the second shaft member 222 through a washer 223 for closing a left end of the damper mechanism 223.

Subsequently, referring to FIG. 16, the outer tube 223b of the damper mechanism 223 is placed such that the outer peripheral spline 223z thereof is located on the right side, and then inserted into the second shaft member 222 from the right end of the second shaft member 222.

During this operation, the outer peripheral spline 223z of the outer tube 223b and the inner peripheral spline 222a of the second shaft member 222 are fitted with each other. Through this operation, the outer tube 223b and the second shaft member 222 are integrally coupled together (first coupling step).

Subsequently, referring to FIG. 16, each of a plurality of rubber members 223c is installed between adjacent ones of a plurality of inner-tube pressure wall portions 223x and a plurality of outer-tube pressure wall portions 223y. As mentioned above, each of the rubber members 223c is installed between adjacent ones of the inner-tube pressure wall portions 223x and the outer-tube pressure wall portions 223y, in a slightly compressed state. Thus, through the installation of the rubber members 223c, a circumferential position of the inner tube 223a is set out. The circumferential position of the inner tube 223a can be set at a given position according to respective circumferential positions of the outer peripheral spline 223z and the inner peripheral spline 222a in the first coupling step.

Subsequently, referring to FIG. 16, a washer 223g for closing a right end of the damper mechanism 223 is fixed by a snap ring 223h. Through the above operations, the damper mechanism 223 is assembled to the inner peripheral surface of the second shaft member 222.

Subsequently, referring to FIG. 17, the first shaft member 221 is placed such that comb-like teeth 221a thereof are located on the right side, and then inserted into the second shaft member 222 from a left end of the second shaft member 222. During this operation, the comb-like teeth 221a of the first shaft member 221 and the comb-like teeth 223d of the inner tube 223a of the damper mechanism 223 are press-fitted with each other. Through this operation, the inner tube 223a and the first shaft member 221 are integrally coupled together (second coupling step). In this operation, the circumferential position of the inner tube 223a has already been set out, as mentioned above. Thus, a circumferential position of the first shaft member 221 integrally coupled to the inner tube 223a is also set out. Therefore, one of the corresponding ones of the external spline teeth 221x of the first shaft member 221 and the internal spline teeth 222x of the second shaft member 222 is located at a circumferential center of a spline bottom of the other. That is, the restriction section is provided in the coupling region between the first shaft member 221 and the second shaft member 222 (the external spline teeth 221x and the internal spline teeth 222x). The outer peripheral spline 223z of the outer tube 223b and the inner peripheral spline 222a of the second shaft member 222 are preliminarily formed so as to allow the restriction section to be adequately provided.

As above, according to the fourth embodiment, it becomes possible to, during the production process of the transfer 20, match circumferential phases of the first shaft member 221 and the second shaft member 222 of the transfer input shaft 22 with each other without using any jig, to thereby eliminate a step using a jig. More specifically, in the first embodiment, the jig J1 is used to match a circumferential phase of the first shaft member 221 coupled to the inner tube 223a of the damper mechanism 223 with a circumferential phase of the second shaft member 222 coupled to the outer tube 223b of the damper mechanism 223. On the other hand, in the fourth embodiment, respective circumferential phases of the first shaft member 221 and the second shaft member 222 can be finally matched with each other through the use of the outer peripheral spline 223z provided in the outer tube 223b and the inner peripheral spline 222a provided in the second shaft member 222, so that the step using the jig can be eliminated. Therefore, according to the fourth embodiment, it becomes possible to provide a transfer 20 which is improved in assemblability. Further, it becomes possible to provide a production method for the transfer 20, which is excellent in productivity.

<Fifth Embodiment>

Next, with reference to FIGS. 18 to 22, a fifth embodiment of the present invention will be described. In the figures, an element or component identical or similar to that in the fourth embodiment is assigned with the same reference sign as that in the fourth embodiment. Thus, description about the same configuration as that in the fourth embodiment will be omitted, and only a configuration different from that in the fourth embodiment will be described below.

Figure 21:
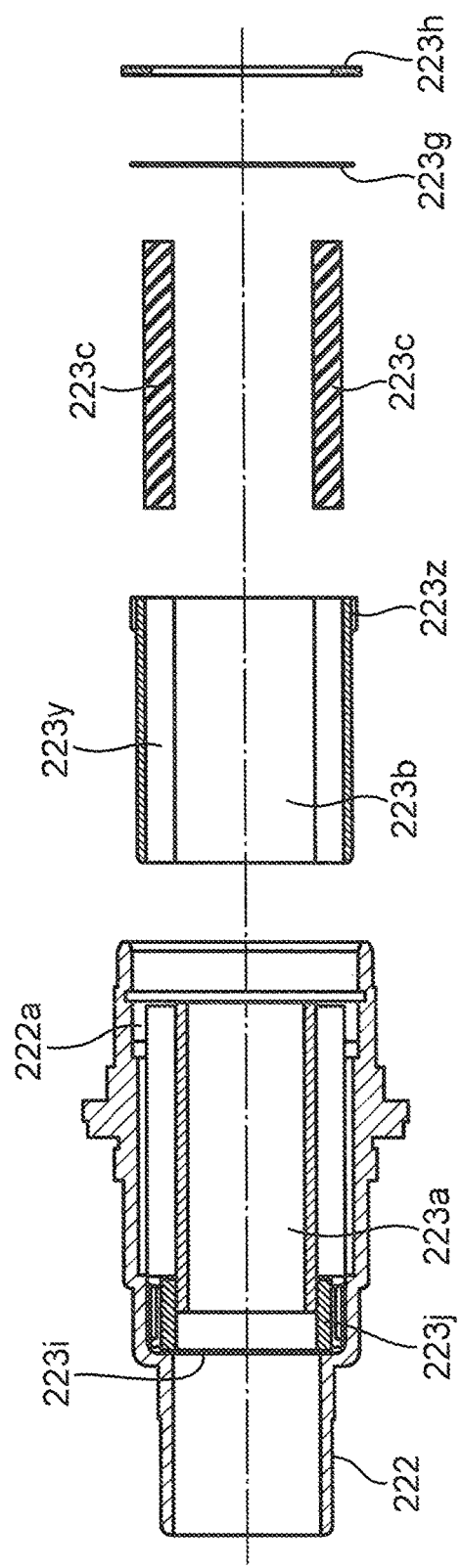
FIG. 21 is a sectional view depicting a first coupling step during assembly of the power transfer unit according to the fifth embodiment.
Figure 22:
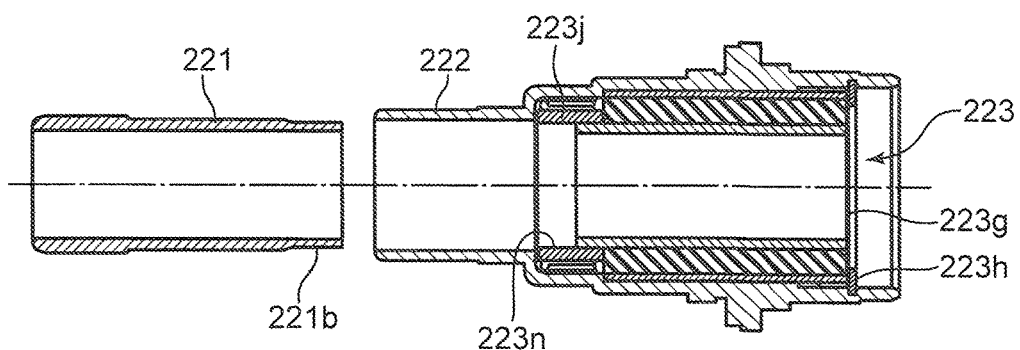
FIG. 22 is a sectional view depicting a second coupling step during assembly of the power transfer unit according to the fifth embodiment.

In terms of configuration, the fifth embodiment is different from the fourth embodiment in that, in a second coupling step, an inner tube 223a of a damper mechanism 223 and a first shaft member 221 are integrally coupled together through an intermediate sleeve 223j, instead of being integrally coupled together by means of comb-like teeth. On the other hand, in terms of configuration, the fifth embodiment is identical to the fourth embodiment in that an outer peripheral spline 223z is provided in an outer tube 223b of the damper mechanism 223, and an inner peripheral spline 222a is provided in a second shaft member 222, and that a production method for a transfer 20 comprises a first coupling step (FIG. 21) and the second coupling step (FIG. 22).

Figure 18:
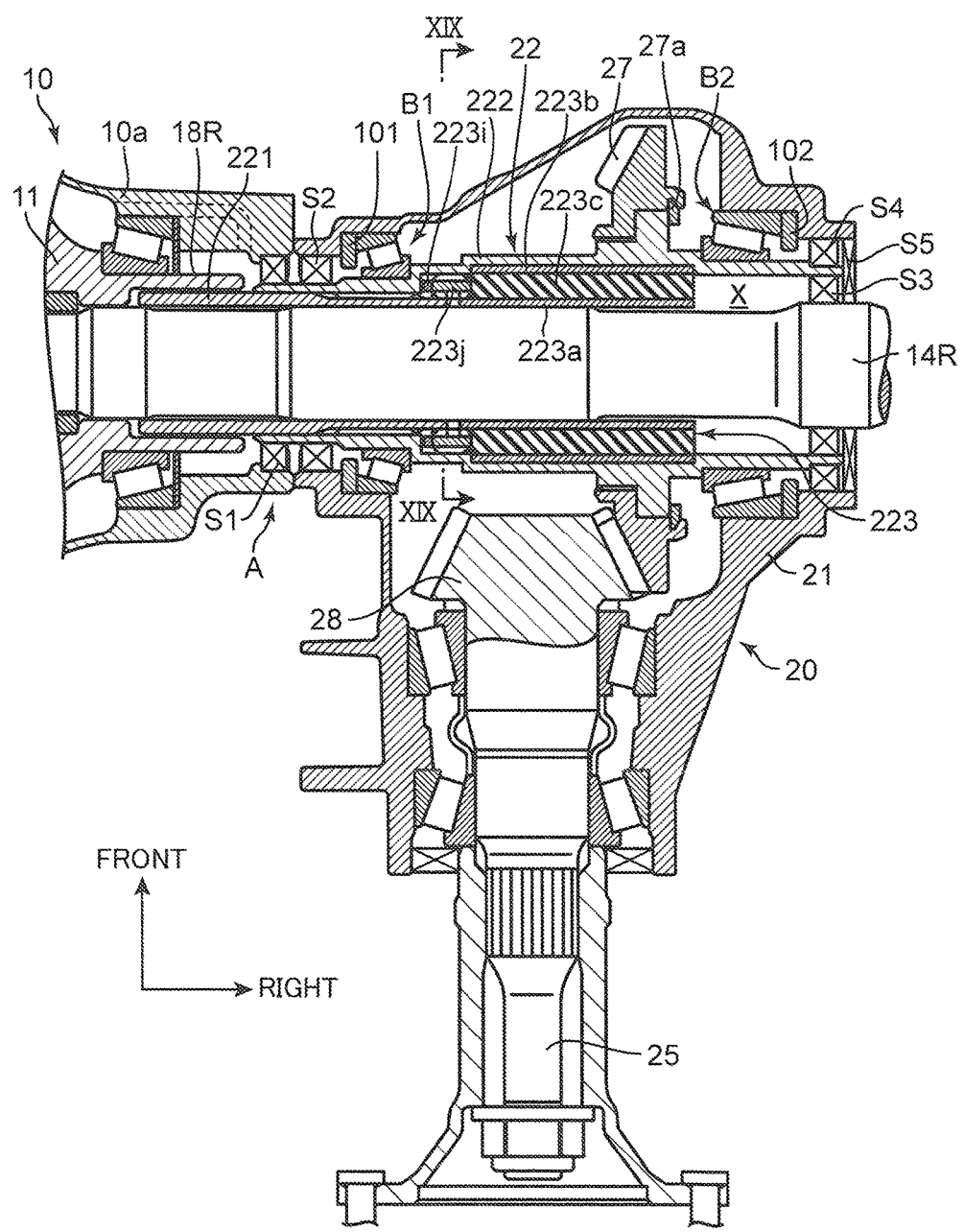
FIG. 18 is a top plan sectional view corresponding to FIG. 2, depicting a power transfer unit according to a fifth embodiment of the present invention.
Figure 19:
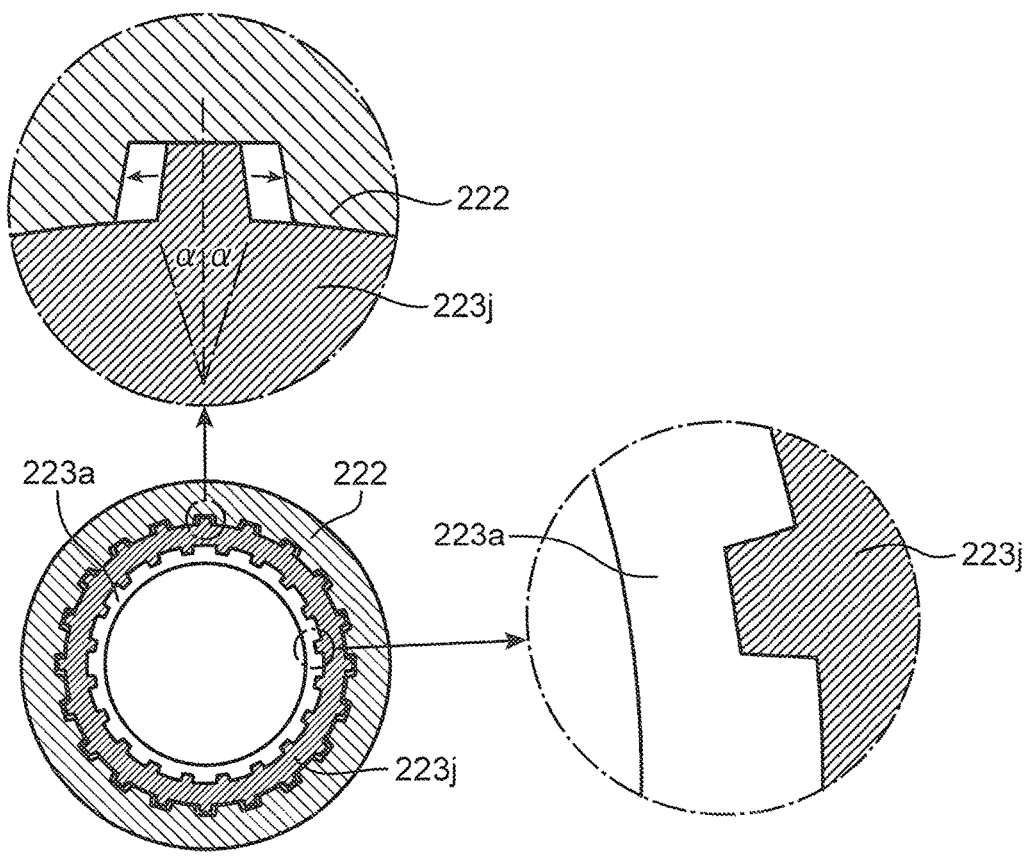
FIG. 19 is a sectional view taken along the line XIX-XIX in FIG. 18.

As depicted in FIGS. 18 and 19, the intermediate sleeve 223j is an axially-short circular cylindrical-shaped member, wherein two splines 223m, 223n are provided, respectively, in an outer peripheral surface and an inner peripheral surface thereof. The spline 223m in the outer peripheral surface is configured to be loosely fitted with a spline 222b (see FIG. 20) provided in an inner peripheral surface of the second shaft member 222. That is, the loose-fitting spline 223m in the outer peripheral surface of the intermediate sleeve 223j and the loose-fitting spline 222b in the inner peripheral surface of the second shaft member 222 are mutually coupled in a circumferentially relatively rotatable manner.

The spline 223n in the inner peripheral surface of the intermediate sleeve 223j is configured to be integrally coupled to a spline 223s (see FIG. 20) provided at a left-end region of an outer peripheral surface of the inner tube 223a. That is, the coupling spline 223n in the inner peripheral surface of the intermediate sleeve 223j and the coupling spline 223s in the outer peripheral surface of the inner tube 223a are mutually coupled in a circumferentially relatively non-rotatable manner. Further, the spline 223n in the inner peripheral surface of the intermediate sleeve 223j is configured to be integrally coupled to a spline 221b (see FIG. 22) provided at a right-end region of an outer peripheral surface of the first shaft member 221. That is, the coupling spline 223n in the inner peripheral surface of the intermediate sleeve 223j and the coupling spline 221b in the outer peripheral surface of the first shaft member 221 are mutually coupled in a circumferentially relatively non-rotatable manner. The above point will be further discussed in detail by describing a production method for the transfer 20 according to the fifth embodiment below based on assembling process diagrams in FIGS. 20 to 22.

Figure 20:
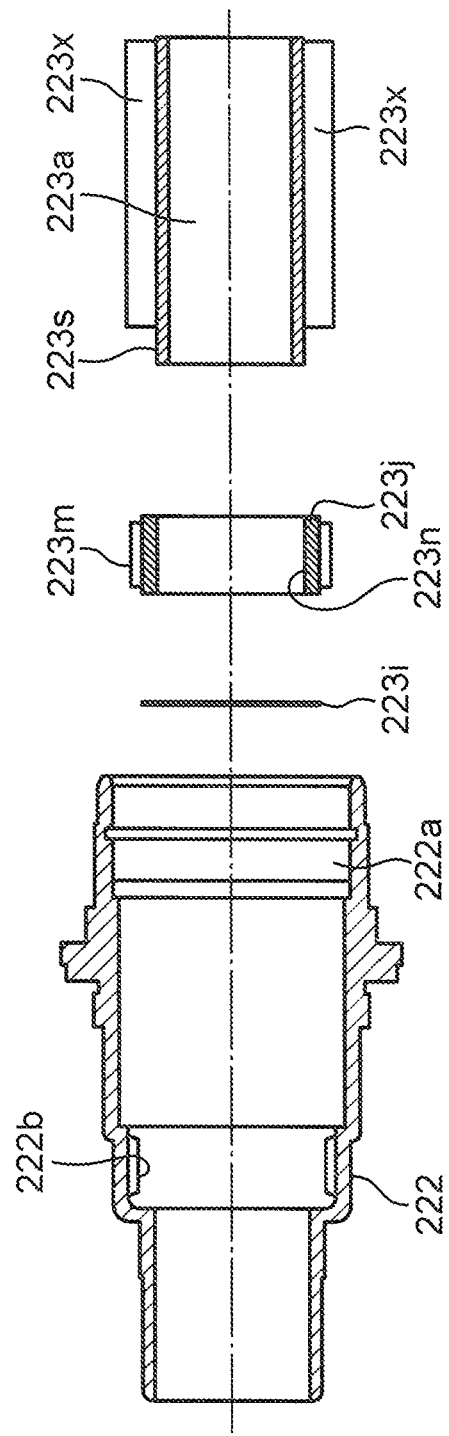
FIG. 20 is an exploded sectional view of a pre-assembly state of the power transfer unit according to the fifth embodiment.

First of all, referring to FIG. 20, the intermediate sleeve 223j is inserted into the second shaft member 222, from a right end of the second shaft member 222 through a washer 223i. During this operation, the loose-fitting spline 223m of the intermediate sleeve 223j and the loose-fitting spline 222b of the second shaft member 222 are mutually fitted loosely.

Subsequently, referring to FIG. 20, the inner tube 223a of the damper mechanism 223 is placed such that the coupling spline 223s thereof is located on the left side, and then inserted into the second shaft member 222 from the right end of the second shaft member 222. During this operation, the coupling spline 223s of the inner tube 223a and the coupling spline 223n of the intermediate sleeve 223j are mutually fitted. Through this operation, the inner tube 223a and the intermediate sleeve 223j are integrally coupled together.

Subsequently, referring to FIG. 21, the outer tube 223b of the damper mechanism 223 is placed such that the outer peripheral spline 223z thereof is located on the right side, and then inserted into the second shaft member 222 from the right end of the second shaft member 222. During this operation, the outer peripheral spline 223z of the outer tube 223b and the inner peripheral spline 222a of the second shaft member 222 are mutually fitted. Through this operation, the outer tube 223b and the second shaft member 222 are integrally coupled together (first coupling step).

Subsequently, referring to FIG. 21, each of a plurality of rubber members 223c is installed between adjacent ones of a plurality of inner-tube pressure wall portions 223x and a plurality of outer-tube pressure wall portions 223y. As mentioned above, each of the rubber members 223c is installed between adjacent ones of the inner-tube pressure wall portions 223x and the outer-tube pressure wall portions 223y, in a slightly compressed state. Thus, through the installation of the rubber members 223c, a circumferential position of the inner tube 223a is set out. The circumferential position of the inner tube 223a can be set at a given position according to respective circumferential positions of the outer peripheral spline 223z and the inner peripheral spline 222a in the first coupling step.

As a result, the circumferential position of the inner tube 223a is set out, and thereby a circumferential position of the intermediate sleeve 223j integrally coupled to the inner tube 223a is also set out. Therefore, one of corresponding teeth of the loose-fitting spline 223m of the intermediate sleeve 223j and the loose-fitting spline 222b of the second shaft member 222 is located at a circumferential center of a spline bottom of the other. That is, a restriction section is provided in a coupling region between the intermediate sleeve 223j and the second shaft member 222 (the loose-fitting spline 223m and the loose-fitting spline 222b). The outer peripheral spline 223z of the outer tube 223b and the inner peripheral spline 222a of the second shaft member 222 are preliminarily formed so as to allow the restriction section to be adequately provided.

Subsequently, referring to FIG. 21, a washer 223g for closing a right end of the damper mechanism 223 is fixed by a snap ring 223h. Through the above operations, the damper mechanism 223 is assembled to the inner peripheral surface of the second shaft member 222.

Subsequently, referring to FIG. 22, the first shaft member 221 is placed such that the coupling spline 221b thereof is located on the right side, and then inserted into the second shaft member 222 from a left end of the second shaft member 222. During this operation, the coupling spline 221b of the first shaft member 221 and the coupling spline 223n of the intermediate sleeve 223j are mutually fitted. Through this operation, the first shaft member 221 and the intermediate sleeve 223j are integrally coupled together, and thus the inner tube 223a and the first shaft member 221 are integrally coupled together through the intermediate sleeve 223j (second coupling step).

As above, in the fifth embodiment, the restriction section is provided before the second coupling step of integrally coupling the inner tube 223a and the first shaft member 221 together. More specifically, the restriction section is provided at a stage of interposing each of the rubber members 223c between the adjacent ones of the inner-tube pressure wall portions 223x and the outer-tube pressure wall portions 223y after the first coupling step of integrally coupling the outer tube 223 b and the second shaft member 222 together. This makes it possible to check whether or not the restriction section is adequately formed, at an earlier stage as compared to the fourth embodiment, to thereby provide a transfer 20 which is more highly improved in assemblability as compared to the fourth embodiment, and a production method for the transfer 20, which much more excellent in productivity as compared to the fourth embodiment.

As above, this specification discloses various aspects of the present invention. Among them, major aspects will be outlined below.

According to one aspect of the present invention, there is provided a power transfer unit for transferring power from a front wheel side to a rear wheel side, or from the rear wheel side to the front wheel side. The power transfer unit comprises: a transfer input shaft coupled to a power source; a transfer output shaft disposed to extend in a direction orthogonal to the transfer input shaft; a transfer drive gear provided on an outer periphery of the transfer input shaft; a transfer driven gear provided on an outer periphery of the transfer output shaft and meshed with the transfer drive gear; and a damper mechanism configured to absorb a fluctuation in torque input from a power source side into the transfer input shaft, wherein the damper mechanism is disposed such that at least a part thereof overlaps the transfer driven gear in an extension direction of the transfer output shaft, in top plan view.

According to this feature, at least a part of the damper mechanism overlaps the transfer driven gear in the extension direction of the transfer output shaft, in top plan view, so that it becomes possible to suppress an increase in dimension of the power transfer unit in the axial direction, as compared, for example, to the case where the damper mechanism and the transfer driven gear are arranged side-by-side in the axial direction of the transfer input shaft as in the aforementioned Patent Literature 1. This provides an advantage of being able to not only suppress deterioration in mountability, but also maintain compatibility with a power transfer unit devoid of the damper mechanism, in terms of a transfer casing. According to the above feature, it also becomes possible to ensure a layout space for the damper mechanism without axially enlarging a transfer casing. This makes it possible to suppress the occurrence of gear rattle between the transfer drive gear and the transfer driven gear, with a compact structure. Therefore, the present invention can provide a power transfer unit which is suppressed in terms of increase in axial dimension.

Specifically, the power transfer unit can be equipped with the damper mechanism without causing protrusion from an occupancy space of a power transfer unit devoid of the damper mechanism. In other words, for ensuring a layout space for the damper mechanism, it is not necessary to increase the axial dimension of the transfer input shaft. This makes it possible to avoid the increase in axial dimension of the transfer casing.

In one embodiment of the present invention, the damper mechanism is provided in a space between an outer periphery of an axle penetrated through the transfer input shaft and an inner periphery of the transfer input shaft.

According to this feature, the damper mechanism is provided in the internal space of the transfer input shaft, so that it becomes possible to ensure the layout space for the damper mechanism by utilizing the internal space of the transfer input shaft without enlarging the transfer casing radially outwardly, as compared to the case where the damper mechanism is disposed on the outer periphery of the transfer input shaft. This makes it possible to suppress the occurrence of gear rattle between the transfer drive gear and the transfer driven gear with a compact structure.

In addition, a member like the transfer drive gear is not installed in the internal space of the transfer input shaft, so that it becomes possible to sufficiently increase a length of the damper mechanism in the axial direction to thereby sufficiently reduce a stress to be loaded on the damper mechanism.

Therefore, according this embodiment it becomes possible to compactly equip a power transfer unit with the damper mechanism by utilizing the internal space of the hollow transfer input shaft. As a result, it becomes possible to provide a power transfer unit capable of sufficiently enlarging the damper mechanism to sufficiently suppress gear rattle between the gears without causing an increase in size of the transfer casing.

In another embodiment of the present invention, the transfer input shaft comprises: a first shaft member configured to receive an input of torque from the power source side; and a second shaft member disposed to extend axially from one end of the first shaft member and coupled to the first shaft member in a circumferentially relatively rotatable manner, wherein the transfer drive gear is provided on an outer periphery of the second shaft member, and the damper mechanism comprises: an inner tube disposed to extend axially from the one end of the first shaft member at a position radially inside the second shaft member and integrally coupled to the first shaft member; an outer tube coupled to an inner peripheral surface of the second shaft member integrally with the second shaft member, and an elastic member interposed between the inner tube and the outer tube.

According to this feature, the first shaft member and the second shaft member of the transfer input shaft are coupled to each other through the elastic member in a relatively rotatable manner, so that a fluctuation in torque from the engine side is absorbed by a torsional displacement of the elastic member in the rotation direction. In addition, a length of the elastic member can be increased in the axial direction so as to reduce a stress to be loaded on the elastic member. In this case, torque input into the first axial member is directed to flow axially in the internal space X of the transfer input shaft, and transferred to the inner tube of the damper mechanism. Then, it is directed to radially flow through the elastic member and the outer tube of the damper mechanism, and transferred to the second shaft member. This direction of torque flow is significantly different from the direction of torque flow in the aforementioned Patent Literature 1 in which the damper mechanism is provided on the outer periphery of the transfer input shaft.

In another embodiment of the present invention, a coupling region between the first shaft member and the second shaft member is provided with a restriction section configured to restrict an occurrence of a situation where the first and second shaft members are relatively rotated beyond a given reference angle.

According to this feature, an excessive torsional displacement of the elastic member can be prevented. This makes it possible to suppress damage to the elastic member and thus improve durability of the damper mechanism.

In another embodiment of the present invention, the first shaft member and the second shaft member are coupled together by means of spline engagement, and configured such that a given reference amount of gap is defined between corresponding ones of spline teeth of the first shaft member and spline teeth of the second shaft member, in a rotation direction thereof; and, when the first shaft member and the second shaft member are relatively rotated by the reference angle, the corresponding spline teeth of the first and second shaft members come into contact with each other to thereby form the restriction section.

According to this feature, by the contact between the corresponding spline teeth, it becomes possible to stably and reliably restrict the occurrence of the situation where the first and second shaft members are relatively rotated beyond the given reference angle. In addition, each length of the spline teeth can be increased in the axial direction so as to reduce a stress to be loaded on the spline teeth. During the contact between the corresponding spline teeth, torque input into the first shaft member is directed to radially flow through the spline engagement region between the first and second shaft members in the internal space of the transfer input shaft, and transferred to the second shaft member. This direction of torque flow is also significantly different from the direction of torque flow in the aforementioned Patent Literature 1 in which the damper mechanism is provided on the outer periphery of the transfer input shaft.

In another embodiment of the present invention, the outer tube has a first fitting portion provided in an outer peripheral surface thereof, and the second shaft member has a second fitting portion provided in the inner peripheral surface thereof; wherein the first and second fitting portions are mutually fitted to thereby integrally couple the outer tube and the second shaft member together, in such a manner as to allow the restriction section to be provided in the coupling region between the first and second shaft members, when the first shaft member is integrally coupled to the inner tube of the damper mechanism including the outer tube.

A according to this feature, it becomes possible to, during the production process of the power transfer unit, match circumferential phases of the first shaft member and the second shaft member of the transfer input shaft with each other without using any jig, to thereby eliminate a step using a jig. That is, in this embodiment, respective circumferential phases of the first shaft member and the second shaft member can be finally matched with each other through the use of the first fitting portion provided in the outer tube and the second fitting portion provided in the second shaft member, so that the step using the jig can be eliminated. Therefore, according to this feature, it becomes possible to provide a power transfer unit which is improved in assemblability.

In another embodiment of the present invention, the damper mechanism is disposed such that at least a part thereof overlaps the transfer output shaft in the extension direction of the transfer output shaft, in top plan view.

According to this feature, it becomes possible to further reduce the axial dimension of the power transfer unit.

In another embodiment of the present invention, the damper mechanism is provided on the outer periphery of the transfer input shaft.

This feature provides an advantage of being able to facilitate assembling, as compared to the case where the damper mechanism is provided in the internal space of the transfer input shaft.

In another embodiment of the present invention, a differential gear unit is disposed on one side of the damper mechanism in the axial direction of the transfer input shaft, and the transfer drive gear is disposed on the other side of the damper mechanism.

According to this feature, it becomes possible to allow the damper mechanism to easily overlay the transfer driven gear disposed between the differential gear unit and the transfer drive gear in top plan view.

In another embodiment of the present invention, the damper mechanism is disposed such that an outwardmost periphery thereof is located radially inwardly with respect to an inwardmost periphery of the transfer drive gear.

According to this feature, it becomes possible to reduce a radial dimension of the damper mechanism and the vicinity thereof.

In another embodiment of the present invention, the damper mechanism comprises: an inner tube coupled to an outer peripheral surface of the transfer input shaft integrally with the transfer input shaft; an outer tube coupled to an inner peripheral surface of the transfer drive gear integrally with the transfer drive gear, and an elastic member interposed between the inner tube and the outer tube, wherein the transfer input shaft has a first engagement portion provided in the outer peripheral surface thereof and the transfer drive gear has a second engagement portion provided in the inner peripheral surface thereof, and wherein the first and second engagement portions are mutually coupled together in a circumferentially relatively rotatable manner to provide a restriction section configured to restrict an occurrence of a situation where the first and second engagement portions are relatively rotated beyond a given reference angle.

According to this feature, the transfer drive gear can be utilized to form a restriction section configured to restrict the occurrence of a situation where the transfer input shaft and the transfer drive gear are relatively rotated beyond the given reference angle, to thereby prevent an excessive torsional displacement of the elastic member. This makes it possible to suppress damage to the elastic member and thus improve durability of the damper mechanism.

According to another aspect of the present invention, there is provided a method for producing the above power transfer unit. The method comprises: a first coupling step of mutually fitting the first and second fitting portions to thereby integrally couple the outer tube and the second shaft member together; and a second coupling step of, after the first coupling step, integrally coupling the first shaft member and the inner tube of the damper mechanism including the outer tube, in such a manner as to provide the restriction section in the coupling region between the first and second shaft members.

According to this feature, it becomes possible to, during the production process of the power transfer unit, match circumferential phases of the first shaft member and the second shaft member of the transfer input shaft with each other without using any jig, to thereby eliminate a step using a jig. That is, according to this feature, respective circumferential phases of the first shaft member and the second shaft member can be finally matched with each other through the use of the first fitting portion provided in the outer tube and the second fitting portion provided in the second shaft member, so that the step using the jig can be eliminated. Therefore, according to this embodiment, it becomes possible to provide a production method for the power transfer unit, which is excellent in productivity.

This application is based on Japanese Patent Application Serial No. 2014-066678 filed in Japan Patent Office on Mar. 27, 2014, the contents of which are hereby incorporated by reference.

While the present invention has been described appropriately and fully in the above by way of the embodiments thereof with reference to the drawings in order to express the present invention, it should be appreciated that a person skilled in the art can easily change and/or modify the aforementioned embodiments. It is therefore to be understood that a changed or modified embodiment implemented by a person skilled in the art is encompassed within the scope of the appended claims unless the changed or modified embodiment is at a level deviating from the scope of the appended claims.

INDUSTRIAL APPLICABILITY

As above, the present invention provides a power transfer unit which is suppressed in terms of increase in axial dimension, a power transfer unit which is improved in assemblability, and a power transfer unit production method which is excellent in productivity. Thus, the present invention has wide industrial applicability in the field of power transfer units.

The invention claimed is:

1. A power transfer unit for transferring power from a front wheel side to a rear wheel side of a vehicle, or from the rear wheel side to the front wheel side of the vehicle, comprising:
   a transfer input shaft coupled to a power source;
   a transfer output shaft disposed to extend in a direction orthogonal to the transfer input shaft;
   a transfer drive gear provided on an outer periphery of the transfer input shaft;
   a transfer driven gear provided on an outer periphery of the transfer output shaft and meshed with the transfer drive gear; and a damper mechanism configured to absorb a fluctuation in torque input from a power source side into the transfer input shaft, wherein the damper mechanism is disposed such that at least a part thereof overlaps the transfer driven gear in a front-rear direction of the vehicle, the damper mechanism is provided in a space between an outer periphery of an axle penetrated through the transfer input shaft and an inner periphery of the transfer input shaft.

2. The power transfer unit as recited in claim 1, wherein the transfer input shaft comprises:
 a first shaft member configured to receive an input of torque from the power source side; and
 a second shaft member disposed to extend axially from one end of the first shaft member and coupled to the first shaft member in a circumferentially relatively rotatable manner, and wherein
the transfer drive gear is provided on an outer periphery of the second shaft member, and
the damper mechanism comprises:
 an inner tube disposed to extend axially from the one end of the first shaft member at a position radially inside the second shaft member and integrally coupled to the first shaft member;
 an outer tube coupled to an inner peripheral surface of the second shaft member integrally with the second shaft member; and
 an elastic member interposed between the inner tube and the outer tube.

3. The power transfer unit as recited in claim 2, wherein a coupling region between the first shaft member and the second shaft member is provided with a restriction section configured to restrict an occurrence of a situation where the first and second shaft members are relatively rotated beyond a given reference angle.

4. The power transfer unit as recited in claim 3, wherein the first shaft member and the second shaft member are coupled together in the coupling region by spline engagement, and configured such that a given reference amount of gap is defined between corresponding ones of spline teeth of the first shaft member and spline teeth of the second shaft member, in a rotation direction thereof, and, when the first shaft member and the second shaft member are relatively rotated by the reference angle, the corresponding spline teeth of the first and second shaft members come into contact with each other to thereby form the restriction section.

5. The power transfer unit as recited in claim 4, wherein the outer tube has a first fitting portion provided in an outer peripheral surface thereof, and
the second shaft member has a second fitting portion provided in the inner peripheral surface thereof, and wherein
the first and second fitting portions are mutually fitted to thereby integrally couple the outer tube and the second shaft member together, in such a manner as to allow the restriction section to be provided in the coupling region between the first and second shaft members, when the first shaft member is integrally coupled to the inner tube of the damper mechanism including the outer tube.

6. A method for producing the power transfer unit as recited in claim 5, comprising:
 a first coupling step of mutually fitting the first and second fitting portions to thereby integrally couple the outer tube and the second shaft member together; and
 a second coupling step of, after the first coupling step, integrally coupling the first shaft member and the inner tube of the damper mechanism including the outer tube, in such a manner as to provide the restriction section in the coupling region between the first and second shaft members.

7. The power transfer unit as recited in claim 3, wherein the outer tube has a first fitting portion provided in an outer peripheral surface thereof, and
the second shaft member has a second fitting portion provided in the inner peripheral surface thereof, and wherein
the first and second fitting portions are mutually fitted to thereby integrally couple the outer tube and the second shaft member together, in such a manner as to allow the restriction section to be provided in the coupling region between the first and second shaft members, when the first shaft member is integrally coupled to the inner tube of the damper mechanism including the outer tube.

8. A method for producing the power transfer unit as recited in claim 7, comprising:
 a first coupling step of mutually fitting the first and second fitting portions to thereby integrally couple the outer tube and the second shaft member together; and
 a second coupling step of, after the first coupling step, integrally coupling the first shaft member and the inner tube of the damper mechanism including the outer tube, in such a manner as to provide the restriction section in the coupling region between the first and second shaft members.

9. A power transfer unit for transferring power from a front wheel side to a rear wheel side of a vehicle, or from the rear wheel side to the front wheel side of the vehicle, comprising:
 a transfer input shaft coupled to a power source;
 a transfer output shaft disposed to extend in a direction orthogonal to the transfer input shaft;
 a transfer drive gear provided on an outer periphery of the transfer input shaft;
 a transfer driven gear provided on an outer periphery of the transfer output shaft and meshed with the transfer drive gear; and
 a damper mechanism configured to absorb a fluctuation in torque input from a power source side into the transfer input shaft, wherein
the damper mechanism is disposed such that at least a part thereof overlaps the transfer driven gear in a front-rear direction of the vehicle, and is provided on the outer periphery of the transfer input shaft,
a differential gear unit is disposed to one side of the damper mechanism in the axial direction of the transfer input shaft, and the transfer drive gear is disposed to the other side of the damper mechanism, and
the transfer drive gear is disposed to be meshed with the transfer driven gear at a position offset toward the other side of the damper mechanism with respect to a central axis of the transfer output shaft.

10. The power transfer unit as recited in claim 9, wherein the damper mechanism is disposed such that an outwardmost periphery thereof is located radially inwardly with respect to an inwardmost periphery of the transfer drive gear.

11. The power transfer unit as recited in claim 10, wherein the damper mechanism comprises:
 an inner tube coupled to an outer peripheral surface of the transfer input shaft integrally with the transfer input shaft;
 an outer tube coupled to an inner peripheral surface of the transfer drive gear integrally with the transfer drive gear; and an elastic member interposed between the inner tube and the outer tube, and wherein the transfer input shaft has a first engagement portion provided in the outer peripheral surface thereof, the transfer drive gear has a second engagement portion provided in the inner peripheral surface thereof, and the first and second engagement portions are mutually coupled in a circumferentially relatively rotatable manner to provide a restriction section configured to restrict an occurrence of a situation where the first and second engagement portions are relatively rotated beyond a given reference angle.

12. The power transfer unit as recited in claim 9, wherein the damper mechanism comprises:

an inner tube coupled to an outer peripheral surface of the transfer input shaft integrally with the transfer input shaft;

an outer tube coupled to an inner peripheral surface of the transfer drive gear integrally with the transfer drive gear; and an elastic member interposed between the inner tube and the outer tube, and wherein the transfer input shaft has a first engagement portion provided in the outer peripheral surface thereof, the transfer drive gear has a second engagement portion provided in the inner peripheral surface thereof, and the first and second engagement portions are mutually coupled in a circumferentially relatively rotatable manner to provide a restriction section configured to restrict an occurrence of a situation where the first and second engagement portions are relatively rotated beyond a given reference angle.

13. The power transfer unit as recited in claim 9, wherein the damper mechanism is disposed such that at least a part thereof overlaps the transfer output shaft in the front-rear direction of the vehicle.

14. A power transfer unit for transferring power from a front wheel side to a rear wheel side of a vehicle, or from the rear wheel side to the front wheel side of the vehicle, comprising:

a transfer input shaft coupled to a power source;

a transfer output shaft disposed to extend in a direction orthogonal to the transfer input shaft;

a transfer drive gear provided on an outer periphery of the transfer input shaft;

a transfer driven gear provided on an outer periphery of the transfer output shaft and meshed with the transfer drive gear; and a damper mechanism configured to absorb a fluctuation in torque input from a power source side into the transfer input shaft, wherein the damper mechanism is disposed such that at least a part thereof overlaps the transfer driven gear in a front-rear direction of the vehicle, and is provided on the outer periphery of the transfer input shaft, wherein the damper mechanism comprises:

an inner tube coupled to an outer peripheral surface of the transfer input shaft integrally with the transfer input shaft;

an outer tube coupled to an inner peripheral surface of the transfer drive gear integrally with the transfer drive gear; and an elastic member interposed between the inner tube and the outer tube, and wherein the transfer input shaft has a first engagement portion provided in the outer peripheral surface thereof, the transfer drive gear has a second engagement portion provided in the inner peripheral surface thereof, and the first and second engagement portions are mutually coupled in a circumferentially relatively rotatable manner to provide a restriction section configured to restrict an occurrence of a situation where the first and second engagement portions are relatively rotated beyond a given reference angle.

15. The power transfer unit as recited in claim 14, wherein the damper mechanism is disposed such that at least a part thereof overlaps the transfer output shaft in the front-rear direction of the vehicle.

\* \* \* \* \*